US012635698B1

(12) United States Patent
Castaneda et al.

(10) Patent No.: US 12,635,698 B1
(45) Date of Patent: May 26, 2026

(54) METHODS FOR CARCASS PREPARATION IN BEEF PROCESSING

(71) Applicant: AB Holdings, LLC, Boise, ID (US)

(72) Inventors: Jesse Castaneda, Yakima, WA (US); Shaun Walk, Yakima, WA (US); Roman Lupercio, Sunnyside, WA (US); Luis Rodriguez, Yakima, WA (US); Craig Smith, Yakima, WA (US); Kevin Lawson, Yakima, WA (US); Denine Trump, Prosser, WA (US); Jeff Cromer, Yakima, WA (US)

(73) Assignee: AB HOLDINGS, LLC, Boise, ID (US)

( * ) Notice: Subject to any disclaimer, the term of this patent is extended or adjusted under 35 U.S.C. 154(b) by 280 days.

(21) Appl. No.: 18/209,372

(22) Filed: Jun. 13, 2023

Related U.S. Application Data

(60) Provisional application No. 63/351,670, filed on Jun. 13, 2022.

(51) Int. Cl.
A22C 9/00 (2006.01)
A22C 15/00 (2006.01)

(52) U.S. Cl.
CPC .............. A22C 9/00 (2013.01); A22C 15/001 (2013.01)

(58) Field of Classification Search
CPC ................................ A22C 9/00; A22C 15/001
USPC ........................................................ 452/185
See application file for complete search history.

(56) References Cited

U.S. PATENT DOCUMENTS

| | | | |
|---|---|---|---|
| 3,593,369 A | 7/1971 | Anderson et al. | |
| 4,993,112 A | 2/1991 | Burnett et al. | |
| 5,334,084 A * | 8/1994 | O'Brien | A22B 5/20 452/157 |
| 5,484,331 A | 1/1996 | Buhlke | |
| 5,664,332 A | 9/1997 | Whited et al. | |
| 2005/0079815 A1 | 4/2005 | Johnson et al. | |
| 2005/0176357 A1 | 8/2005 | Ilch et al. | |
| 2008/0003937 A1* | 1/2008 | Vote | A22B 5/0064 700/226 |
| 2008/0026684 A1* | 1/2008 | Tomcak | A22B 5/0035 452/135 |
| 2012/0108155 A1 | 5/2012 | Bolte et al. | |
| 2015/0037475 A1 | 2/2015 | Lobel | |
| 2018/0055062 A1 | 3/2018 | Andersen | |

* cited by examiner

*Primary Examiner* — Richard T Price, Jr.
(74) *Attorney, Agent, or Firm* — BRYAN CAVE LEIGHTON PAISNER LLP

(57) ABSTRACT

A method including, after at least hide removal and pathogen cleaning of a beef carcass, performing two or more carcass preparation operations on the beef carcass in a carcass preparation room that is separate from other hide-off processing. The method also includes cooling the beef carcass. The beef carcass undergoes rigor mortis during cooling of the beef carcass after the two or more carcass preparation operations are performed on the beef carcass. The method additionally includes, after cooling the beef carcass, performing fabrication floor processing on the beef carcass to separate the beef carcass into primal cuts. Other embodiments are described.

21 Claims, 50 Drawing Sheets

METHODS FOR CARCASS PREPARATION IN BEEF PROCESSING

CROSS-REFERENCE TO RELATED APPLICATION

This application claims the benefit of U.S. Provisional Application No. 63/351,670, filed Jun. 13, 2022. U.S. Provisional Application No. 63/351,670 is incorporated herein by reference in its entirety.

TECHNICAL FIELD

This disclosure relates generally to beef processing and relates more specifically to carcass preparation in beef processing.

BACKGROUND

Conventionally, a processing plant for beef production generally involves two areas of processing cattle carcasses, namely: (i) the "harvest floor" (or "harvest side") of the plant; and (ii) the "fabrication floor" (or "fab floor," "fabrication side," or "fab side") of the plant. These two broad, main, areas of the plant involve different types of processing and have long been physically separated for a number of reasons including, for example, differences in temperature between the two areas, isolation of potential contaminants, reduced temperature on the fabrication side for preservation and elimination or reduction of potential pathogens, and other purposes and reasons known to those of ordinary skill in the art. The harvest floor is generally comparatively warm or hot in temperature, for example it can often be between 80° F. (degrees Fahrenheit) and 90° F. By contrast, the fab floor is generally much cooler, for example, generally below 44° F.

The harvest side conventionally involves: (i) receiving cattle; (ii) stunning and sticking of the cattle; (iii) hide-on processing; and (iv) a portion of hide-off processing. In receiving the cattle, the cattle are generally received and placed in pens, are sprayed down and/or cleaned off to remove manure and bacteria or pathogens, and are moved into the processing facility for individual hide-on processing. In hide-on processing, the cattle are first stunned, the carcass is hung by its hind legs and bled out, the hide and some other parts of the outer carcass are removed, and the carcass is cleaned, generally using organic acid, steam, and/or a thermal wash (e.g., in atomized steam). In hide-off processing on the harvest side of the processing plant, the internal organs are removed from the carcass, the carcass is split lengthwise into halves (left side and right side), the carcass and organs are inspected by the USDA (United States Department of Agriculture) inspectors, and the carcass sides are then weighed at a so-called "hot scale" (or "pay scale") to obtain an official hot carcass weight, which is generally used in circumstances in which cattle is provided by a cattle supplier to, for example, to determine a payment to be made to the cattle supplier. The carcass sides each hang individually from a hook or other device by the rear leg attached to an overhead conveyor system that moves the carcasses along the processing path. Hide-off processing also generally includes further cleaning using thermal washing and/or organic acid, which is achieved before the carcass is moved to the fabrication side of the plant. Additionally, electrical stimulation may be and is often applied to the carcass during hide-off processing before the onset of rigor mortis, and cooling of the carcass, to improve meat tenderness.

After the harvest floor, as is known in the art, the hanging carcass sides are conventionally moved into a cooler or series of coolers that chill the carcasses. For example, there can be a single cooler or series of coolers, such as three "hot boxes," followed by a "sales cooler," and as the carcasses are batch cooled the internal temperature is reduced, the carcasses are exposed to cooler temperatures resulting in the carcasses having reduced temperatures. When the carcasses leave the hide-off department of the harvest floor and enter the first cooler or hot box, the carcasses typically have a warm temperature, for example generally of approximately 95° F. Often, the carcasses are sprayed with cool water in one or more of the coolers to aid in the chilling process and/or to maintain desired moisture levels in the meat. The coolers result in typically lowering the internal temperature of the carcasses to below approximately 44° F., such as at approximately 38-43° F., over the course of time, typically over a course of 24 to 48 hours. During the cooling process, the carcasses undergo a rigor mortis process, in which the muscles in the carcass stiffen for a time, and then soften to some extent as rigor mortis resolves. However, even after rigor mortis resolves, as a result of the much colder temperature of the product, the carcasses are significantly stiffer and less malleable as compared to their state when in the harvest side of the process. The final cooler is conventionally referred to as the "sales cooler," which is where the carcasses are generally graded for quality and staged by quality grade, weight, brands, programs, and/or other attributes. The coolers provide a transition zone between the harvest floor (where the carcasses are hot), and the fab floor (where the carcasses are cold).

After being chilled in the coolers, the hanging carcass sides conventionally move to the fabrication floor. On the fab floor, the carcasses generally have a cold temperature at approximately 38-43° F., and the carcasses get separated into primal cuts, namely, the chuck, the rib, the loin, and the round. As the carcass side hangs from its hind leg, at the bottom is the chuck, comprising the neck, arm (foreleg), shoulder, and first five ribs. The chuck is removed first from the bottom of the hanging carcass, leaving the rib primal at the new bottom of the hanging carcass. Next, the rib, comprising the sixth through twelfth ribs, is removed, leaving the loin primal at the new bottom of the hanging carcass. Next, the loin, which comprises the thirteenth rib, the short loin, the sirloin, and the tenderloin, is removed, leaving the round as the final remaining primal. The round comprises the rear leg and buttock. In processing on the fab floor, the primal parts are deboned, trimmed of fat, and, in many cases, cut into various forms of subprimal parts. For example, some of the subprimal cuts of meat can include the top round, the tenderloin, the brisket, the rib eye, etc. These subprimal cuts are packaged and boxed. The trim produced in this process also is binned or boxed. The boxed beef cuts and trimmings are them moved into warehouse or shipping areas for eventual delivery to customers. Other forms of inspection are performed on the fabrication side of processing including, for example, tests to ensure that there is no contamination of the product including, by way of example, for *Escherichia coli* (*E.-coli*).

The processing performed by operators on the fab floor on the carcasses, and the primal and subprimal cuts thereof, is highly labor-intensive. Many primal and subprimal cuts have a large number of bones of various shapes, sizes, and contours that form a complex skeletal structure of the specific cut. Because the meat has already undergone chilling and rigor mortis when it reaches the fab side, making appropriate cuts in the product including, for example, removing the meat from the bones while optimizing the sub-primal yields, is a very difficult and manually intensive operation that can require the operator to have tremendous strength and skill, and typically necessitates maintaining a very sharp knife. And, regardless of the strength and skill of the operators, the necessary work is extremely physically taxing. Additionally, various primal cuts from the carcass sides can be very heavy, weighing over, for example, 50 pounds each, 75 pounds each, or even in some cases over 100 pounds each, such that, even when the primal cut is supported on a surface (e.g., a cutting table, a conveyor belt, etc.), the actions of moving, rotating, or otherwise manually manipulating and cutting the primal cut by the operator can require the operator to have significant strength and is physically demanding. Given the difficulty in cutting the cold meat, the complex contours of the bones, and the weight of the primal cuts, the multiple manipulations of the knife performed by the operator in navigating the contours of the complex bone structures in the deboning operations can sometimes lead to fatigue, wrist and/or arm strains, repetitive motion injuries, and/or other injuries.

BRIEF DESCRIPTION OF THE DRAWINGS

To facilitate further description of the embodiments, the following drawings are provided in which.

Figure 1:
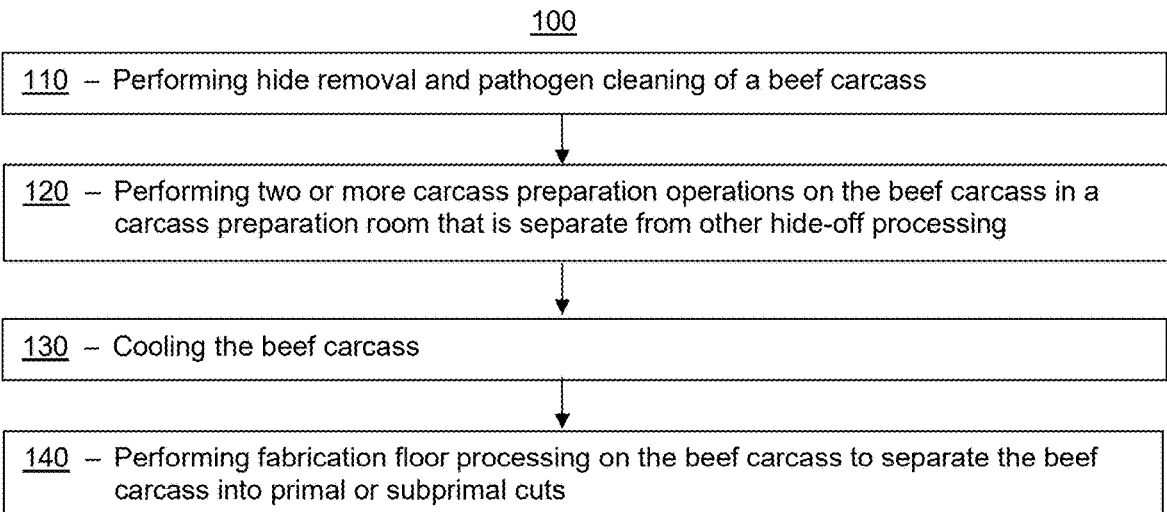
FIG. 1 illustrates a flow chart for a method of carcass preparation in beef processing, according to an embodiment.

For simplicity and clarity of illustration, the drawings and figures herein illustrate the general manner of the systems, methods, and construction, and descriptions and details of well-known features and techniques may be omitted to avoid unnecessarily obscuring the invention. Additionally, elements in the drawings and figures are not necessarily drawn to scale. For example, the dimensions of some of the elements, steps, and features in the figures may be exaggerated relative to other elements, steps, and features, to help improve understanding of embodiments of the present invention. The same reference numerals in different figures denote the same elements.

The terms "first," "second," "third," "fourth," and the like in the description and in the claims, if any, are used for distinguishing between similar elements and features and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments of the invention include a method including, after at least hide removal and pathogen cleaning of a beef carcass, performing two or more carcass preparation operations on the beef carcass in a carcass preparation room that is separate from other hide-off processing. The method also includes cooling the beef carcass. The beef carcass undergoes rigor mortis during cooling of the beef carcass after the two or more carcass preparation operations are performed on the beef carcass. The method additionally includes, after cooling the beef carcass, performing fabrication floor processing on the beef carcass to separate the beef carcass into primal cuts.

Various embodiments of the invention include a method including, after at least hide removal and pathogen cleaning of a beef carcass, performing one or more carcass preparation operations on the beef carcass. The method also includes cooling the beef carcass. The beef carcass undergoes rigor mortis during cooling of the beef carcass after the one or more carcass preparation operations are performed on the beef carcass. The method additionally includes, after cooling the beef carcass, performing fabrication floor processing on the beef carcass to separate the beef carcass into primal cuts. The one or more carcass preparation operations include at least one of: boning of a neck bone of the beef carcass; marking at least one of a brisket bone oyster, a round oyster, a top sirloin, a flank steak, or rib cap muscles of the beef carcass; at least one of pre-seaming between a top round and a round eye of the beef carcass of the beef carcass, pre-seaming between the round eye and a bottom round flat of the beef carcass of the beef carcass, or pre-seaming between a sirloin tip and the bottom round flat of the beef carcass; peeling a banana shank of the beef carcass; dropping a rear portion of a tri-tip of the beef carcass; chining of a chuck bone of the beef carcass; removing a back strap of the beef carcass; removing a flank steak membrane of the beef carcass; or trimming or removing at least one of internal pelvic fat, bottom round fat, loin area fat, tri-tip fat, or shoulder area fat of the beef carcass.

As described above, the processing performed by operators on the fab floor on the carcass, and the primal and subprimal cuts thereof, is highly labor-intensive, can be physically demanding, can require operators to have tremendous strength and skill, typically necessitates maintaining a very sharp knife, can be extremely physically taxing, and/or can sometimes lead to fatigue, wrist and/or arm strains, repetitive motion injuries, and/or other injuries. To address the issues and other issues, and/or to provide various benefits, many of which are described herein, in many embodiments, the present invention comprises a new method, process, and manner of carcass preparation in which certain new steps and/or intermediate steps may be performed at or after the harvest side of the processing, and before the fabrication side of processing, while the carcass is still hot, before the meat has undergone rigor mortis, before the carcass has significantly cooled, and/or before the carcass reaches the fab floor. In several embodiments of the new invention, the carcass preparation process can be performed on the harvest floor at or near the end of the conventional hide-off processing step. For example, the new carcass preparation process can be performed after the carcass is pre-processed to remove and/or kill bacteria and pathogens, which can eliminate and/or mitigate any food safety concerns with processing the carcass. In many embodiments, the carcass preparation process can be performed after the carcass is weighed at the pay scale, such that the operations of the carcass preparation process do not reduce the official weight of the carcass. In some embodiments, the carcass preparation process can be performed before the electrical stimulation is applied to the carcass. In other embodiments, the carcass preparation process can be performed after the electrical stimulation is applied to the carcass. In a number of embodiments, the carcass preparation process can be a new stage after the hide-off process and before the cooling and rigor mortis processes. In a number of embodiments, the carcass preparation process can be performed in a separate room or area at or near the end of the hide-off process, before the carcass moves into the first hot box room, or immediately upon entering the cooler but before the carcass has had time to significantly reduce in temperature. For example, the overhead conveyor system can be routed from the end of the hide-off department into another room dedicated to the carcass preparation process, and then routed into the first hot box room. In other embodiments, the carcass preparation process can be performed in the first cooler room, such that the carcass can begin to be cooled while the carcass preparation process is performed on it. In other embodiments, the separate room dedicated to the carcass preparation process described above can instead be a cooled room, which can begin the carcass chilling process during the carcass preparation process and before the carcass moves to the first hot box room. No matter where this carcass preparation process is performed, it is a new and intermediate pre-rigor step. Location is not imperative to the action of the process.

In many embodiments, the carcass preparation process can involve performing operations on the carcass while the carcass is still hot or warm (e.g., at or above approximately 95° F., at or above approximately 90° F., at or above approximately 85° F., at or above approximately 80° F. or, in some embodiments, simply above 45° F.), which can cause the later processing of the carcass, the primal cuts and/or the subprimal cuts on the fab floor (after cooling of the carcass, e.g., to below approximately 44° F., and after the rigor mortis process has happened) to be easier, faster, more precise, and/or less labor-intensive, and/or to provide other benefits, many of which are described herein. In several embodiments, the one or more operations of the carcass preparation process can be performed while the carcass is hanging from the overhead conveyor system, which can result in those operations being easier and/or more ergonomic than when similar operations are performed on the fab floor on primal cuts that are supported on surfaces (e.g., cutting tables, conveyor belts, etc.). In many cases, such operations can be easier to perform when the carcass is hanging due at least in part to gravity assisting with portions of the operation as well as the location of the carcass to facilitate ease of access to the location of the cuts.

In several embodiments, the carcass preparation process can involve performing one or more operations on the carcass. For example, one type of operation that can be included in the carcass preparation process can involve pre-boning, i.e., deboning before chilling and rigor mortis, of certain parts of the carcass. In many cases, these pre-boning operations are easier and/or more ergonomic to perform on a hot carcass than on a cold carcass, and in many cases, are easier and/or more ergonomic to perform while the carcass is hanging from the overhead conveyor system as opposed to deboning a primal cut sitting on a surface, therefore, increasing yields through workmanship and improving employee endurance due to a safer and easier workload.

Another type of operation that can be included in the carcass preparation process can involve removal of external and/or internal fat from the carcass. In some embodiments, the fat removal operations can be performed more readily and with substantially greater precision using automated mechanical devices (e.g., Whizard® trimmers by Bettcher Industries, Inc., or other well-known and/or suitable devices) while the carcass is hot, whereas similar operations on a cold carcass conventionally involve more time, less precision (even with higher-skilled labor), and/or more manual labor. Even highly skilled laborers on the fab side are unable to achieve the precision of fat removal achieved in the new carcass preparation process before chilling and rigor mortis.

The fat removed from the carcass goes typically to rendering, which involves, among other things, heating the fat. When the fat is removed in the carcass preparation process while the carcass is still hot or warm, the fat goes to rendering while it is still hot or warm, which results in significantly less energy being expended to heat the fat in the rendering process than is involved when the fat is chilled on the carcass in the coolers and removed when cold on the fab floor. Although some fat is conventionally removed on the harvest floor, the carcass preparation process can perform additional and valuable removal of external and/or internal fat from the carcass, which can significantly increase the amount of fat removed before chilling and rigor mortis. For example, in some cases, the amount of fat removed conventionally after the pay scale and before chilling was on the order of 48 pounds, but adding the additional and new fat removal operations in the carcass preparation process described herein can increase the amount of fat removed before chilling to, for example, over 50 pounds, over 65 pounds, over 70 pounds, over 75 pounds, and in some cases even over 80 pounds. Removing additional surface fat earlier in the process is extremely beneficial as it also reduces the risk of bacterial infections, such as *E.-coli* infections, spreading within the carcass and/or to other areas of the beef processing plant, is more cost effective, reduces the cost to cool or chill the carcasses, and eases fabrication of the product.

Yet another type of operation that can be included in the carcass preparation process can involve seaming, i.e., separation of muscles along seams while the carcass is hot or warm. When the carcass has been chilled and undergone the rigor mortis process as is done in the prior art, separation of muscles along seams is difficult, even for skilled operators, as the separation involves significant manual effort and force to cut a knife through the tougher, cold meat, which often results in cutting into one or the other muscle instead of precisely following the seam. By contrast, when the carcass is hot or warm, the operator is able to more accurately cut along the seam much easier and separate the two muscles without cutting, or materially cutting, into either muscle on the sides of the seam. Additionally, the hanging of the carcass in this new process and step often makes the cutting process easier, as gravity serves to pull open the cut regions as the knife cuts along the seam, and readily exposes surfaces of the carcass as it hangs (as opposed to the fab side, where lifting and rotating the heavy, chilled, primal cuts is often involved to expose various surfaces of the primal cuts). In contrast to the brute force involved in cutting and seaming operations on the cold carcass on the fab floor, seaming operations on the hot or warm carcass in the carcass preparation process can involve finesse and surgical operation. Low-skilled operators using significantly less force are able to cut a seam much more precisely on a hot or warm carcass than highly skilled operators typically are able to do on a cold carcass or primal cut on the fab floor. In addition to the benefit of having more precise cuts, the increased precision of the seaming operations also results in less purge. Purge is the mix of blood and water that ends up as waste in the bottom of bags or packaging of subprimal cuts. The more that a muscle is cut into during the seaming operation, the more purge will end up in the bottom of the packaging of that muscle. By contrast, there is less purge when the seaming operation is performed precisely as is permitted with embodiments of the present invention.

Still another type of operation that can be included in the new carcass preparation process can involve marking, i.e., cutting portions of certain parts of the carcass without fully removing or separating the cut portion from the carcass. For example, a bone or muscle can be marked by partially cutting around the bone or muscle, without fully removing the bone or muscle. In some cases, marking a bone or muscle can be performed as an operation by one operator in the carcass preparation process, and then another operator in a separate operation of the carcass preparation process can perform the remainder of the deboning of the bone or removal of the muscle. This later deboning operation can be made easier by the initial marking operation. In other embodiments, after the initial marking operation, the remainder of the deboning or muscle separation operation is not performed until after the carcass has been chilled and is further processed on the fab floor. The initial marking operation in the carcass preparation process can facilitate, ease, and simplify, such operations on the fab floor.

Details of exemplary operations of an exemplary carcass preparation process of the present invention are described herein. The carcass preparation process and the operations thereof described herein are merely exemplary, and embodiments of the carcass preparation process and the operations thereof are not limited to the embodiments described herein. The carcass preparation process and the operations thereof can be performed in many different embodiments or examples not specifically depicted or described herein. In some embodiments, the operations, the procedures, the processes, and/or the activities of carcass preparation process can be performed in the order presented. In other embodiments, the operations, the procedures, the processes, and/or the activities of the carcass preparation process can be performed in another suitable order. In still other embodiments, one or more of the operations, the procedures, the processes, and/or the activities of the carcass preparation process can be combined or skipped.

Turning to the drawings, FIG. 1 illustrates a flow chart for a method 100 of carcass preparation in beef processing, according to an embodiment. Method 100 is merely exemplary and is not limited to the embodiments presented herein. The method can be employed in many different embodiments or examples not specifically depicted or described herein. In some embodiments, the procedures, the processes, and/or the activities of method 100 can be performed in the order presented. In other embodiments, the procedures, the processes, and/or the activities of method 100 can be performed in another suitable order. In still other embodiments, one or more of the procedures, the processes, and/or the activities of method 100 can be combined or skipped.

Referring to FIG. 1, method 100 can include an activity 110 of performing hide removal and pathogen cleaning of a beef carcass. The hide removal and pathogen cleaning can be performed using conventional harvest side processing. In many embodiments, activity 110 also can include various types of hide-off processing, such on the harvest side, such as splitting the beef carcass into left and right halves, hanging the beef carcass from an overhead conveyor system, pathogen cleaning, weighing of the beef carcass, electrical stimulation of the beef carcass, and/or other suitable hide-off processing. In several embodiments, the pathogen cleaning can include one or more cleaning processes, such as using organic acid, steam, and/or a thermal wash (e.g., in atomized steam) on the beef carcass. In several embodiments, the beef carcass can be among multiple beef carcasses hanging from the overhead conveyor system.

In a number of embodiments, method 100 also can include an activity 120 of performing two or more carcass preparation operations on the beef carcass in a carcass preparation room that is separate from other hide-off processing (such as the conventional hide-off processing described above). In many embodiments, activity 120 can be performed after activity 110.

In some embodiments, the carcass preparation operations are performed on the beef carcass while a temperature of the beef carcass is at or above approximately 80° F. In other embodiments, the carcass preparation operations are performed on the beef carcass while the temperature of the beef carcass is at or above approximately 95° F., at or above approximately 90° F., at or above approximately 85° F., or, in some embodiments, simply above 45° F. In some embodiments, the carcass preparation room is a cooled room. In other embodiments, the carcass preparation room is hot or warm. In some embodiments, the carcass preparation operations are performed on the beef carcass while the beef carcass is hanging from an overheard conveyor.

In some embodiments, the carcass preparation operations performed in the carcass preparation room can include 1, 2, 3, 4, 5, 6, 7, 8, 9, 10, 11, 12, 13, 14, 15, 16, 17, 18, or more of the following operations, and, in some embodiments, can include other operations that have conventionally been performed on the fabrication size:

boning of a neck bone of the beef carcass;
marking a brisket bone oyster of the beef carcass;
marking a round oyster of the beef carcass;
marking a top sirloin of the beef carcass;
marking a flank steak of the beef carcass;
marking rib cap muscles of the beef carcass of the beef carcass;
pre-seaming between a top round and a round eye of the beef carcass;
pre-seaming between the round eye and a bottom round flat of the beef carcass;
pre-seaming between a sirloin tip and the bottom round flat of the beef carcass;
peeling a banana shank of the beef carcass;
dropping a rear portion of a tri-tip of the beef carcass;
chining of a chuck bone of the beef carcass;
removing a back strap of the beef carcass;
removing a flank steak membrane of the beef carcass;
trimming and/or removing internal pelvic fat of the beef carcass;
trimming and/or removing bottom round fat of the beef carcass;
trimming and/or removing loin area fat of the beef carcass;
trimming and/or removing tri-tip fat of the beef carcass;
trimming and/or removing shoulder area fat of the beef carcass;

trimming and/or removing kidney fat of the beef carcass;
trimming and/or removing rib cap fat of the beef carcass;
trimming and/or removing of top round fat of the beef carcass;
pulling an inside skirt of the beef carcass;
popping a feather pone of the beef carcass;
separating a shoulder and a chuck blade of the beef carcass;
pre-seaming between a sirloin tip and a top round of the beef carcass; and/or
marking of a brisket bone or an outside skirt of a brisket of the beef carcass.

Figure 3:
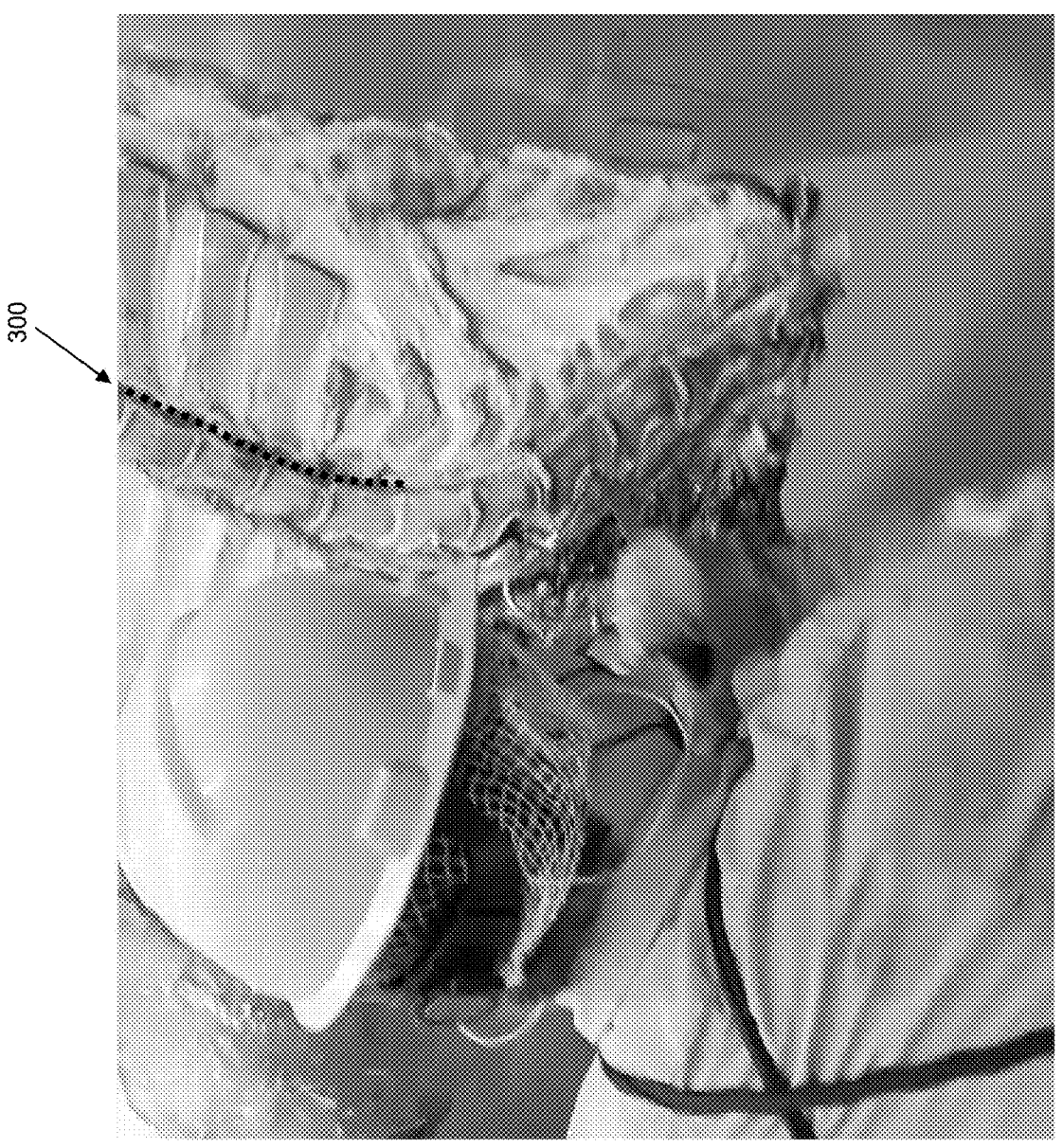
FIG. 3 shows an image of an operator beginning to mark the bottom side (leftward in FIG. 3) of the neck bone of a hot carcass.
Figure 67:
FIG. 67 shows an image of the operator of FIG. 66 continuing cutting to mark the lifter meat.

These operations are shown in FIGS. 3-67 and/or described below.

In a number of embodiments, method 100 also can include an activity 130 of cooling the beef carcass. In many embodiments, the beef carcass undergoes rigor mortis during cooling of the beef carcass after the two or more carcass preparation operations are performed on the beef carcass. In many embodiments, cooling of the beef carcass can be performed according to conventional approaches, such as using one or more coolers, such as hot boxes and/or a sales cooler. In many embodiments, cooling the beef carcass can result in the beef carcass cooling to a internal temperature of below approximately 44° F., such as at approximately 38-43° F. In some embodiments, a quantity of fat removed from the beef carcass before the beef carcass undergoes rigor mortis during cooling of the beef carcass is at or above approximately 65 pounds. In other embodiments, the quantity of fat removed from the beef carcass before the beef carcass undergoes rigor mortis during cooling of the beef carcass is at or above approximately 50 pounds, 70 pounds, 75 pounds, and in some cases 80 pounds.

In a number of embodiments, method 100 also can include an activity 140 of performing fabrication floor processing on the beef carcass to separate the beef carcass into primal and/or subprimal cuts. In many embodiments, activity 140 can be performed after activity 130. In many embodiments, the fabrication floor processing can be similar to conventional fabrication floor processing, except that the carcass preparation operations performed in the carcass preparation room have previously been performed and, to the extent previously performed, are not needed to be performed during the fabrication floor processing.

Figure 2:
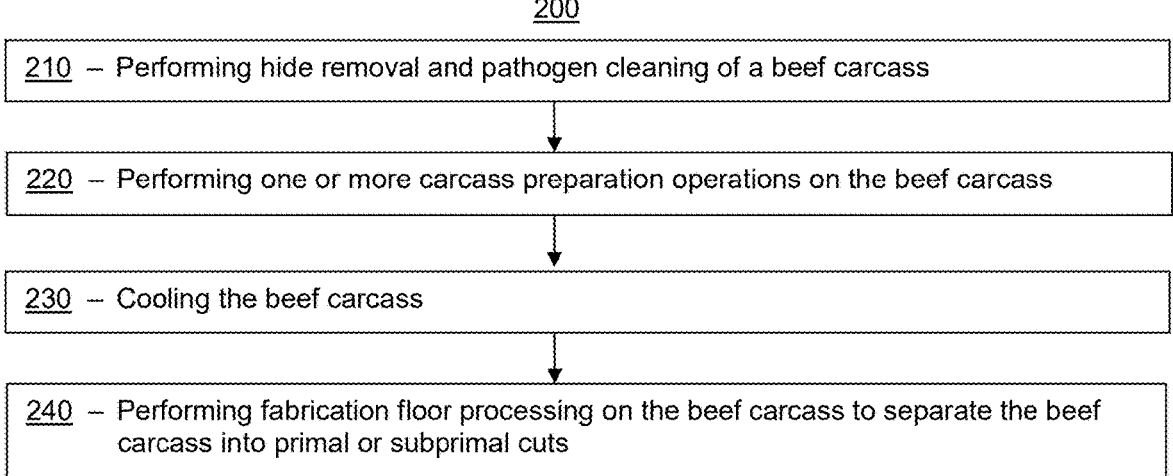
FIG. 2 illustrates a flow chart for a method of carcass preparation in beef processing, according to another embodiment.

Turning ahead in the drawings, FIG. 2 illustrates a flow chart for a method 200 of carcass preparation in beef processing, according to another embodiment. Method 200 is merely exemplary and is not limited to the embodiments presented herein. The method can be employed in many different embodiments or examples not specifically depicted or described herein. In some embodiments, the procedures, the processes, and/or the activities of method 200 can be performed in the order presented. In other embodiments, the procedures, the processes, and/or the activities of method 200 can be performed in another suitable order. In still other embodiments, one or more of the procedures, the processes, and/or the activities of method 200 can be combined or skipped.

Referring to FIG. 2, method 200 can include an activity 210 of performing hide removal and pathogen cleaning of a beef carcass. Activity 210 can be similar or identical to activity 110 (FIG. 1).

In a number of embodiments, method 200 also can include an activity 220 of performing one or more carcass preparation operations on the beef carcass. In many embodiments, activity 220 can be performed after activity 210. The carcass preparation operations can include 1, 2, 3, 4, 5, 6, 7, 8, 9, 10, 11, 12, 13, 14, 15, 16, 17, 18, or more of the following operations, and, in some embodiments, can include other operations that have conventionally been performed on the fabrication size:

boning of a neck bone of the beef carcass;
    marking a brisket bone oyster of the beef carcass;
    marking a round oyster of the beef carcass;
    marking a top sirloin of the beef carcass;
    marking a flank steak of the beef carcass;
    marking rib cap muscles of the beef carcass of the beef carcass;
    pre-seaming between a top round and a round eye of the beef carcass;
    pre-seaming between the round eye and a bottom round flat of the beef carcass;
    pre-seaming between a sirloin tip and the bottom round flat of the beef carcass;
    peeling a banana shank of the beef carcass;
    dropping a rear portion of a tri-tip of the beef carcass;
    chining of a chuck bone of the beef carcass;
    removing a back strap of the beef carcass;
    removing a flank steak membrane of the beef carcass;
    trimming and/or removing internal pelvic fat of the beef carcass;
    trimming and/or removing bottom round fat of the beef carcass;
    trimming and/or removing loin area fat of the beef carcass;
    trimming and/or removing tri-tip fat of the beef carcass; and/or
    trimming and/or removing shoulder area fat of the beef carcass.

These operations are shown in FIGS. 3-67 and described below.

In some embodiments, the carcass preparation operations are performed on the beef carcass while a temperature of the beef carcass is at or above approximately 80° F. In other embodiments, the carcass preparation operations are performed on the beef carcass while the temperature of the beef carcass is at or above approximately 95° F., at or above approximately 90° F., at or above approximately 85° F., or, in some embodiments, simply above 45° F. In some embodiments, the carcass preparation operations are performed on the beef carcass while the beef carcass is hanging from an overheard conveyor.

In some embodiments, the one or more carcass preparation operations are performed in a carcass preparation room that is separate from other hide-off processing (such as the conventional hide-off processing described above). In some embodiments, the carcass preparation room is a cooled room. In other embodiments, the carcass preparation room is hot or warm.

In a number of embodiments, method 200 also can include an activity 230 of cooling the beef carcass. In many embodiments, the beef carcass undergoes rigor mortis during cooling of the beef carcass after the one or more carcass preparation operations are performed on the beef carcass. Activity 230 can be similar or identical to activity 130 (FIG. 1). In some embodiments, a quantity of fat removed from the beef carcass before the beef carcass undergoes rigor mortis during cooling of the beef carcass is at or above approximately 65 pounds. In other embodiments, the quantity of fat removed from the beef carcass before the beef carcass undergoes rigor mortis during cooling of the beef carcass is at or above approximately 50 pounds, 70 pounds, 75 pounds, and in some cases 80 pounds.

In a number of embodiments, method 200 also can include an activity 240 of performing fabrication floor processing on the beef carcass to separate the beef carcass into primal and/or subprimal cuts. In many embodiments, activity 240 can be performed after activity 230. In many embodiments, the fabrication floor processing can be similar to conventional fabrication floor processing, except that the carcass preparation operations performed in the carcass preparation room have previously been performed and, to the extent previously performed, are not needed to be performed during the fabrication floor processing. Activity 240 can be similar or identical to activity 140 (FIG. 1).

In some embodiments, the carcass preparation operations performed in activities 120 (FIG. 1) and/or 220 (FIG. 2) can include various operations in the new carcass preparation process. Many of the carcass preparation operations are shown in FIGS. 3-67 and described below. The carcass preparation operations of the new carcass preparation process also can include other operations conventionally performed in fabrication floor processing.

Figure 5:
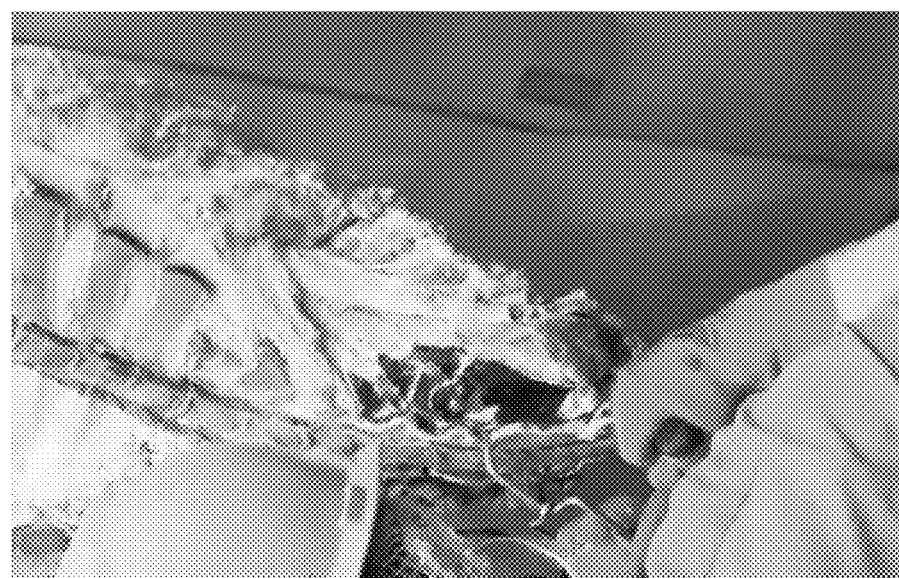
FIG. 5 shows an image of the operator of FIG. 3 marking the top side (rightward in FIG. 5) of the neck bone.
Figure 4:
FIG. 4 shows an image of the operator of FIG. 3 continuing to mark the bottom side of the neck bone.
Figure 6:
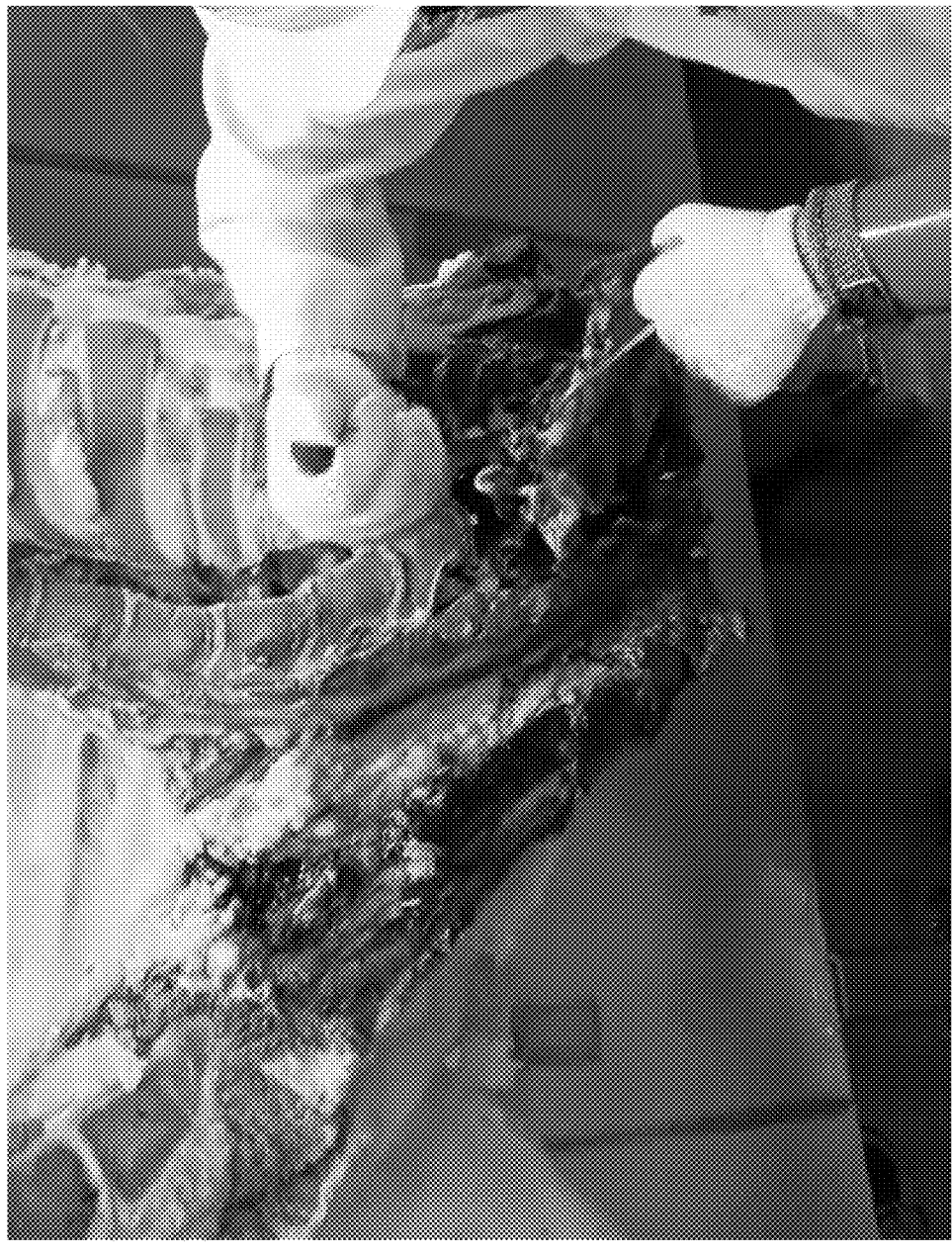
FIG. 6 shows an image of an operator beginning to cut behind the marked sides of the neck bone, as marked in FIGS. 3-5, to begin an operation of removing the neck bone.
Figure 7:
FIG. 7 shows an image of the operator of FIG. 6 continuing to cut behind the neck bone in an effort to fully remove the neck bone from the carcass.
Figure 8:
FIG. 8 shows an image of the chuck region of the hot carcass after the neck bone has been removed, as removed in FIGS. 6-7, as well as the removed neck bone.

In some embodiments, the new carcass preparation process can include operations of marking and/or removing all or at least a portion of the chuck bone, which includes the neck bone and the feather bone. In some embodiments, the operations can involve marking and/or removing the neck bone, while not marking and/or removing the feather bone. In other embodiments, the operations can involve marking and/or removing both the neck bone and the feather bone. In some embodiments, the marking operation can be performed by one or more operators that are different from the one or more operators that perform the final removal operation. Conventionally, an operator on a fab floor uses a knife to cut around the chuck bone to remove the chuck bone from the cold chuck primal cut (including the neck bone and/or the feather bone). The chuck bone is particularly challenging to remove with a knife, while limiting the amount of meat removed, because the vertebrae in the chuck bone contain many varying contours. The process is especially difficult when the meat is cold, as the meat is much more difficult to cut when cold than when hot or warm. Performing marking and/or deboning of the neck bone and/or feather bone is significantly easier and more ergonomic when the carcass is still hot or warm. FIGS. 3-5 show an operation in the new carcass preparation process on a hot carcass in which the operator is using a knife to mark the neck bone at the 1st-3rd vertebrae, which requires significantly less force, may be performed with greater finesse, and may be performed much quicker. In FIG. 3, the operator begins to mark the bottom side (leftward as shown in FIG. 3) of the neck bone. In FIG. 4, the operator continues to mark the bottom side of the neck bone. In FIG. 5, the operator marks the top side (rightward as shown in FIG. 5) of the neck bone. FIGS. 6-8 show an operation in the carcass preparation process on a hot carcass in which an operator is using a knife to remove the neck bone ("boning of the neck"), after the neck bone was marked in a previous operation (such as by the neck marking operation shown in FIGS. 3-5). In FIG. 6, the operator begins to cut behind the marked sides of the neck bone. In FIG. 7, the operator continues to cut behind the neck bone in an effort to fully remove the neck bone from the carcass. FIG. 8 shows the chuck region of the hot carcass after the neck bone has been removed, as well as the removed neck bone. This operation can all be achieved much faster and with greater ease as opposed to the prior art method of performing these tasks in the fab room. In addition, or alternatively, to removing the neck bone, the operator can perform an operation of chining of the chuck bone, such as cutting along dotted line 500 shown in FIG. 3.

Figure 9:
FIG. 9 shows an image of an operator cutting along a bottom side (leftward in FIG. 9) of the brisket oyster of a hot carcass, to begin an operation of marking the brisket oyster.
Figure 10:
FIG. 10 shows an image of the operator of FIG. 9 cutting along a top side (rightward in FIG. 10) of the brisket oyster.
Figure 11:
FIG. 11 shows an image of the operator of FIG. 9 cutting behind the marks made in FIGS. 9-10 on the brisket oyster, starting at the front (bottomward in FIG. 11) of the brisket oyster.
Figure 12:
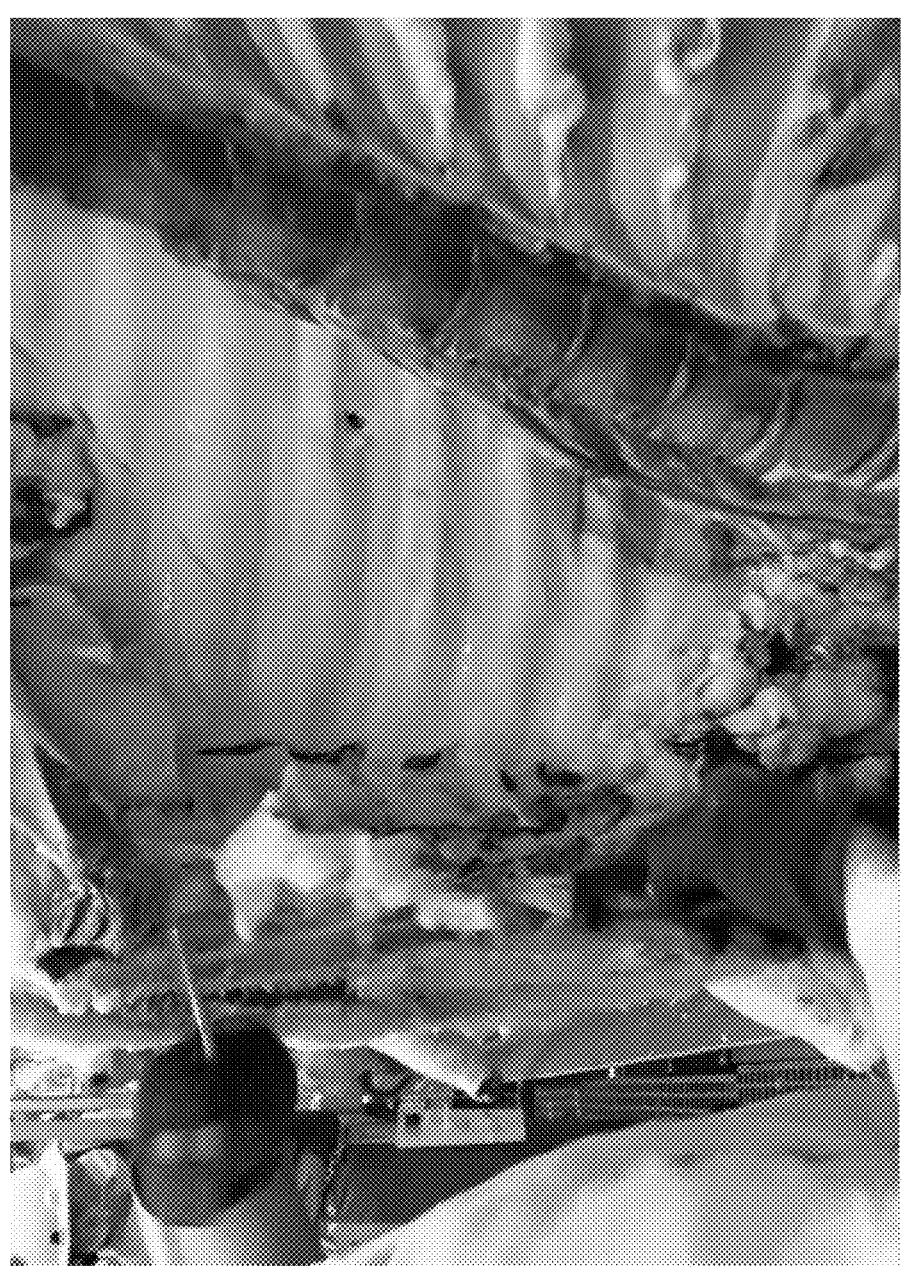
FIG. 12 shows an image of the operator of FIG. 9 continuing cutting behind the marks made in FIGS. 9-10 on the brisket oyster, moving rearward (upward as shown in FIG. 12), to partially separate a flap of the brisket oyster.

In some embodiments, the carcass preparation process can include an operation of marking the brisket oyster (i.e., tranversus thoracis and associated components). FIGS. 9-12 show an operation in the carcass preparation process on a hot carcass in which the operator is using a knife to mark the brisket oyster in the rib region of the carcass. In FIG. 9, an operator cuts along a bottom side (leftward as shown in FIG. 9) of the brisket oyster. In FIG. 10, the operator cuts along a top side (rightward as shown in FIG. 10) of the brisket oyster. In FIGS. 11-12, the operator cuts behind the marks, starting at the front (bottomward as shown in FIGS. 11-12) of the brisket oyster, and moving rearward (upward as shown in FIGS. 11-12), to partially separate a flap of the brisket oyster.

Figure 14:
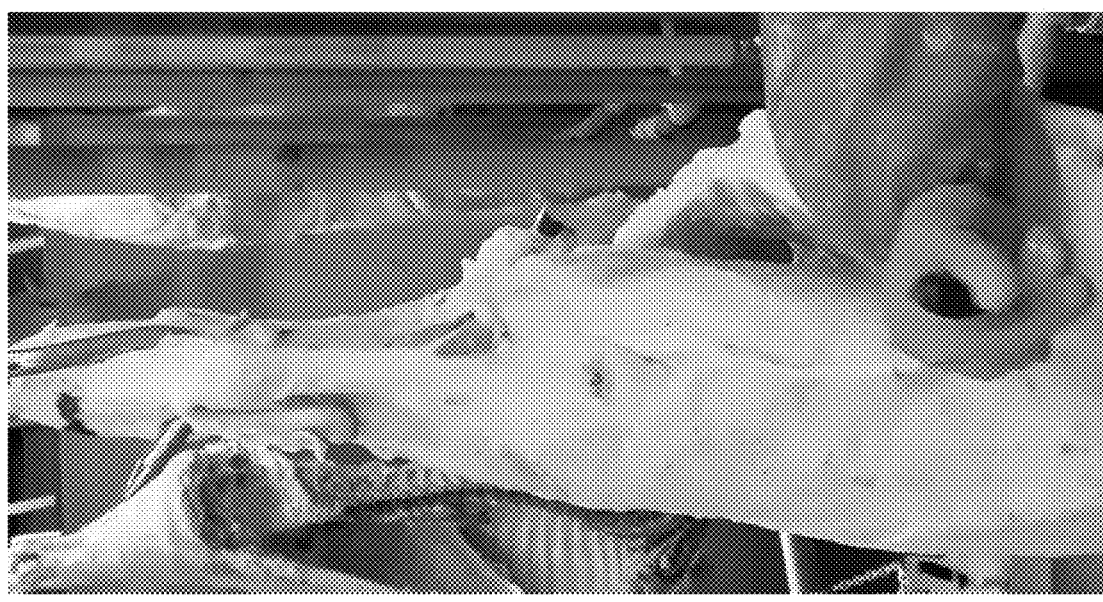
FIG. 14 shows an image of the operator of FIG. 13 continues to cut into the seam to separate the top round from the round eye.
Figure 13:
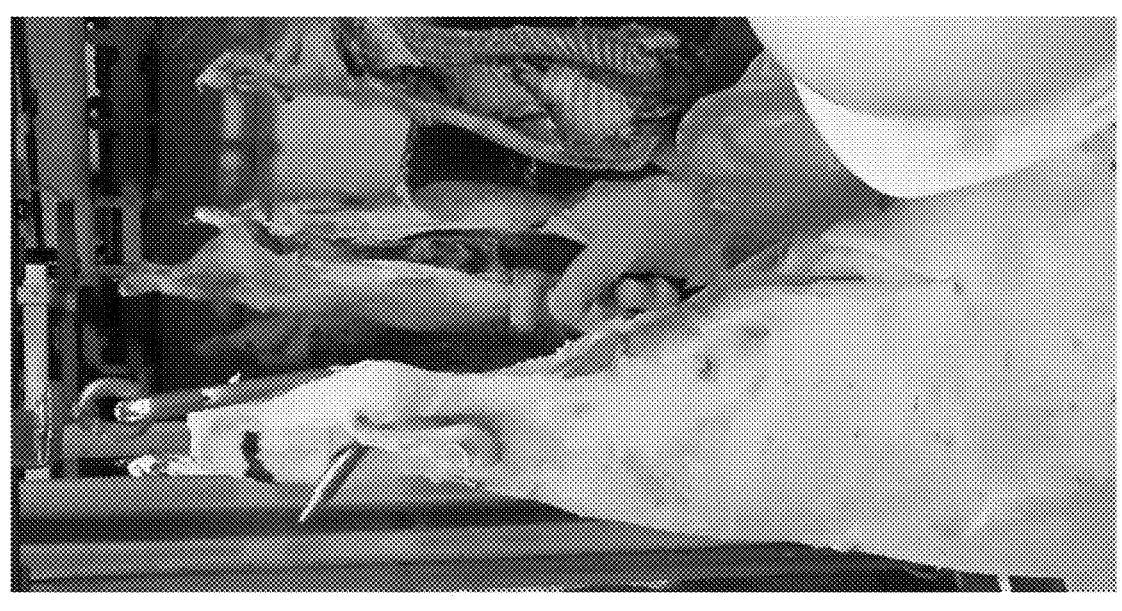
FIG. 13 shows an image of an operator using a knife to begin to cut along the seam between the top round and the round eye, to begin an operation of seaming the top round of a hot carcass.
Figure 15:
FIG. 15 shows an image of the result of the operation of FIGS. 13-14 of seaming the top round on the hot carcass.

In some embodiments, the carcass preparation process can include an operation of seaming the top round, i.e., separating the top round from the round eye. FIGS. 13-15 show an operation in the carcass preparation process on a hot carcass in which the operator is using a knife to seam the top round. In FIG. 13, an operator uses a knife to begin to cut along the seam between the top round and the round eye. In FIG. 14, the operator continues to cut into the seam to separate the top round from the round eye. FIG. 15 shows the result of the operation of seaming the top round on the hot carcass, showing how the top round has been separated surgically from the round eye without the operator having cut into the either of the muscles (the top round or the round eye). Although the seaming of the top round involves significant brute force on the fab side, the seaming operation of the top round is much easier and faster before chilling and rigor mortis, involving finesse with the knife instead of brute force. The level of precision shown in FIG. 15 that resulted from the seaming operation would be very difficult, if not impossible, for a highly skilled operator on the fab side after chilling and rigor mortis, but the operation can be performed precisely by a low-skilled operator, using significantly less force, in the carcass preparation process while the carcass is still hot. By seaming the top round in the carcass preparation process, the operation of removing the top round from the round primal cut in the fab side is much easier, as the muscles are already partially separated.

Figure 16:
FIG. 16 shows an image of an operator seaming the eye of round of a hot carcass.

In some embodiments, the carcass preparation process can include an operation of seaming the eye of round, i.e., separating the eye of round from the bottom round. FIG. 16 shows an operation in the new carcass preparation process on a hot carcass in which the operator is using a knife to seam the eye of round, after the top round has already been seamed (such as by the operation shown in FIGS. 13-15). FIG. 16 shows an operator cutting in the seam of the eye of round, showing how the eye of round has been separated surgically from the bottom round without the operator having cut into either of the muscles (the eye of round or the bottom round).

Figure 18:
FIG. 18 shows an image of the round oyster of FIG. 17 marked and partially separated as a flap on the round region of the carcass.
Figure 17:
FIG. 17 shows an image of an operator using a knife to begin to cut along the round oyster of a hot carcass to begin an operation of marking the round oyster.

In some embodiments, the carcass preparation process can include an operation of marking the round oyster (i.e., obturator muscles). FIGS. 17-18 show an operation in the carcass preparation process on a hot carcass in which the operator is using a knife to mark the round oyster. In FIG. 17, the operator uses a knife to begin to cut along the round oyster. FIG. 18 shows the round oyster marked and partially separated as a flap on the round region of the carcass. This pre-cut of the round oyster can make the process of removing the round oyster significantly easier, requiring less time and manpower, and more precise than on the fab side.

Figure 20:
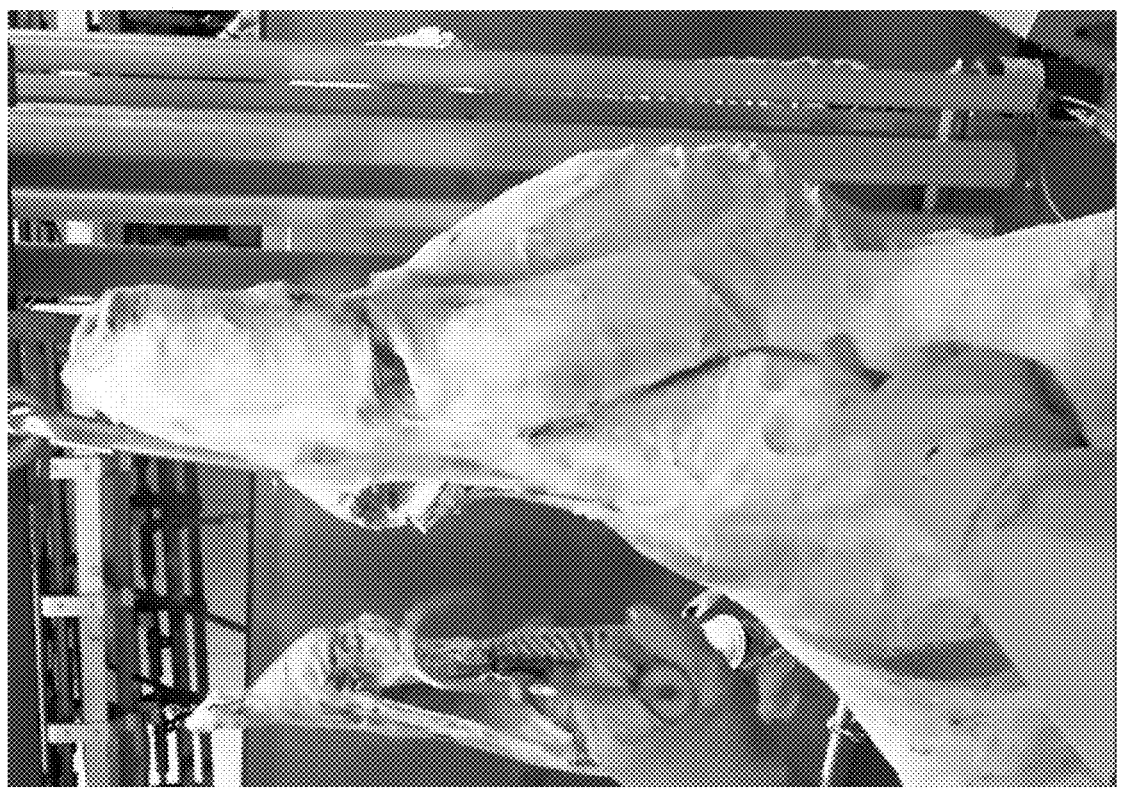
FIG. 20 shows an image of the operator of FIG. 19 making a cut downward (in FIG. 20) along the hand shank.
Figure 19:
FIG. 19 shows an image of an operator using a knife to make a heel cut at the bottom area (shown at the top of FIG. 19) of the hind shank, to begin operations of marking the hind shank and peeling the banana shank of a hot carcass.
Figure 22:
FIG. 22 shows an image of the operator of FIG. 19 continuing to cut the banana shank while the banana shank is peeled outward from the round region using the hook.
Figure 21:
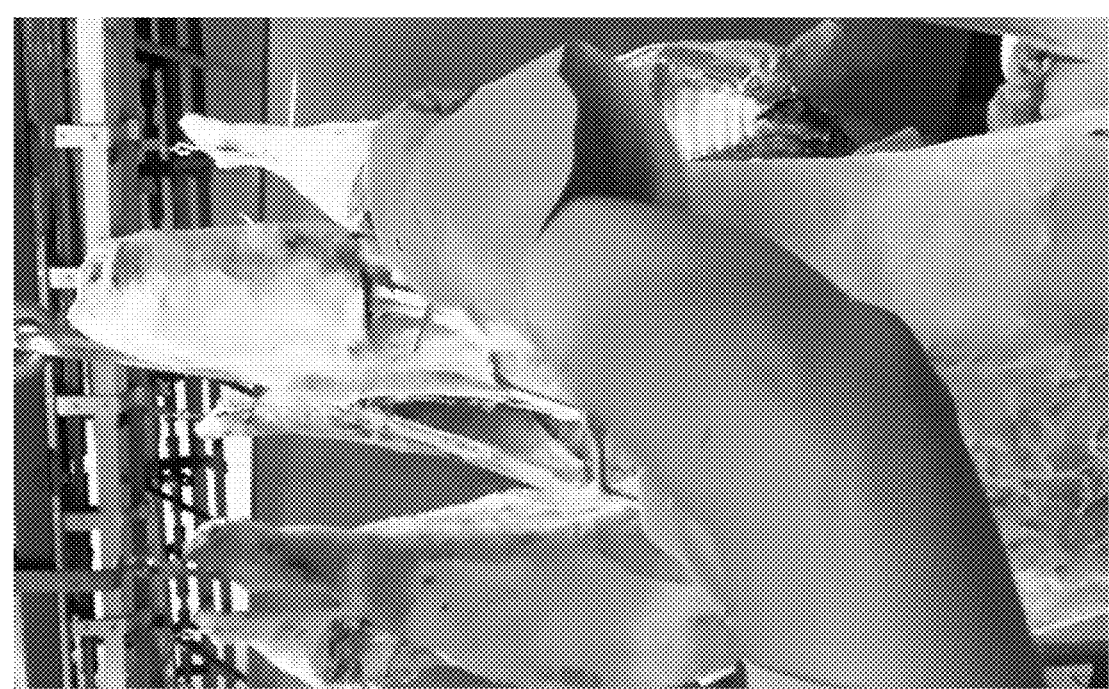
FIG. 21 shows an image of the operator of FIG. 19 beginning to cut the banana shank and pulling the banana shank with a hook.
Figure 23:
FIG. 23 shows an image of the hind shank of FIG. 19 marked and the banana shank as peeled (in FIGS. 21-22) and partially separated on the round region of the carcass.

In some embodiments, the carcass preparation process can include operations of marking the hind shank and peeling the banana shank (includes the long digital extensor, peroneus tertius, and medial digital extensor muscles). FIGS. 19-23 shows operations in the carcass preparation process on a hot carcass in which the operator is using a knife to mark the hind shank and peel the banana shank on the top part of the hind leg of the carcass. In FIG. 19, an operator uses a knife to make a heel cut at the bottom area (shown at the top of FIG. 19) of the hind shank. In FIG. 20, the operator makes a cut downward (in FIG. 20) along the hand shank. In FIG. 21, the operator begins to cut the banana shank and pulls the banana shank with a hook. In FIG. 22, the operator continues to cut the banana shank while the banana shank is peeled outward from the round region using the hook. FIG. 23 shows the hind shank marked and the banana shank peeled and partially separated on the round region of the carcass. These operations of marking the hind shank and peeling the banana shank are far easier to perform before chilling, as the operations can be readily performed by a single operator in approximately 8-15 seconds. By contrast, on the fab side, these operations generally involve four separate operators each handling a portion of these operations, with each of the four operators taking roughly 8-20 seconds a piece, performing very labor-intensive, difficult, operations by operators that are more highly skilled.

Figure 24:
FIG. 24 shows an image of an operator using a knife to seam the sirloin tip from the top round of a hot carcass.

In some embodiments, the carcass preparation process can include an operation of seaming the knuckle (i.e., seaming/separating the sirloin tip from the top round in the round region of the carcass). FIG. 24 shows an operation in the carcass preparation process on a hot carcass in which the operator is using a knife to seam the knuckle, separating the sirloin tip (also known as the knuckle) from the top round. In some embodiments, seaming of the knuckle also can involve another operation of seaming the sirloin tip from bottom round on the other side of the sirloin tip (not shown).

Figure 25:
FIG. 25 shows an image of an operator using a knife to mark a front portion (downward in FIG. 25) of the tri-tip to create an "elephant ear" to begin an operation of marking an dropping a rear portion of the tri-tip of a hot carcass.
Figure 27:
FIG. 27 shows an image of a portion of the tri-tip of FIG. 26 dropped away from the round region.
Figure 26:
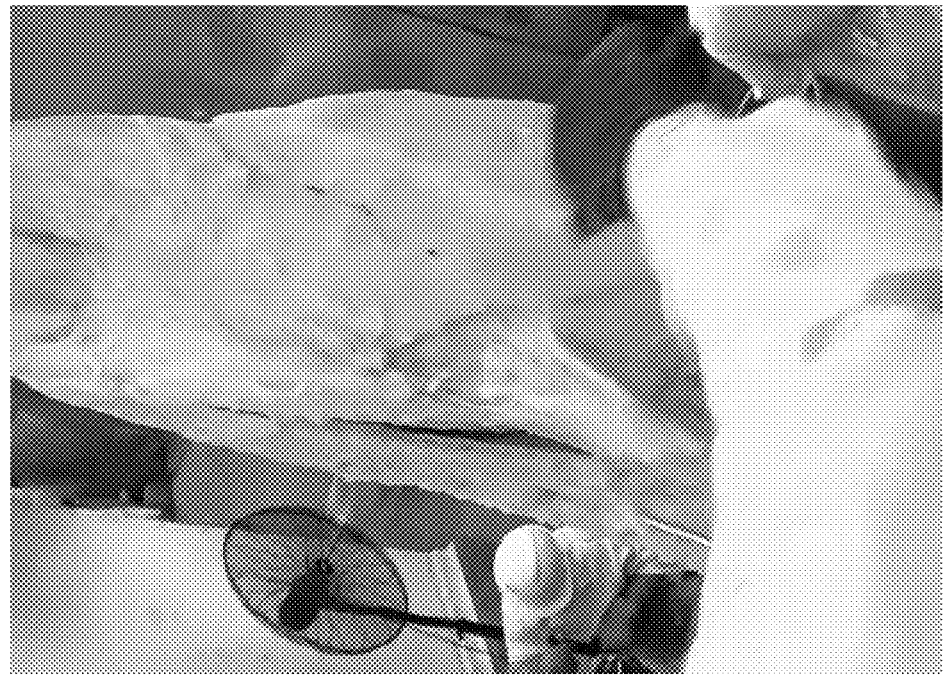
FIG. 26 shows an image of the operator of FIG. 25 using a knife to mark and begin to separate a rear portion (upward in FIG. 26) of the tri-tip from the round region and drop the rear portion toward the neck (downward in FIG. 26)

In some embodiments, the carcass preparation process can include an operation of marking and dropping a rear portion of the tri-tip. FIGS. 25-27 show operations in the carcass preparation process on a hot carcass in which the operator is using a knife to mark and drop a rear portion of the tri-tip. In FIG. 25, an operator uses a knife to mark a front portion (downward as shown in FIG. 25) of the tri-tip to create an "elephant ear." In FIG. 26, the operator uses a knife to mark and begin to separate a rear portion (upward as shown in FIG. 26) of the tri-tip from the round region and drop the rear portion toward the neck (downward as shown in FIG. 26). FIG. 27 shows a portion of the tri-tip dropped away from the round region. Dropping this rear portion of the tri-tip makes separation of the loin primal from the round primal easier and more accurate by preventing cutting off and leaving the rear portion of the tri-tip on the round primal when loin primal is sawed off of the round primal on the fab side. In many embodiments, only a small portion of the tri-tip at the rear of the tri-tip on the carcass is pre-cut in the carcass preparation process during the carcass preparation process, as cutting a larger portion of the tri-tip before chilling and rigor mortis would cause that larger portion to significantly shorten, as it would not be attached and stretched on the hanging carcass during chilling and rigor mortis. Performing this operation of marking and dropping the rear portion of the tri-tip before chilling and rigor mortis can be easier, faster, and more precise than performing this operation of the fab side. Additionally, when dropping the rear of the tri-tip is performed on fab side to prepare for the loin primal to be sawed off of the round primal, an additional operation of injecting carbon dioxide injection between the muscles is often performed just before dropping the tri-tip, which can make it easier to cut and separate the tri tip when the carcass is cold. By contrast, when the rear of the tri-tip is removed on the hot side in the carcass preparation process, the operation can be performed without first injecting carbon dioxide in the muscle.

Figure 28:
FIG. 28 shows an image of an operator using a knife to start to make a cut to mark the top sirloin of a hot carcass.
Figure 29:
FIG. 29 shows an image of the top sirloin of FIG. 28 having been marked on the loin region of the carcass.

In some embodiments, the carcass preparation process can include an operation of marking the top sirloin (also sometimes referred to as "marking the sacrum"). FIGS. 28-29 show an operation in the carcass preparation process on a hot carcass in which the operator is using a knife to mark the top sirloin in the loin region of the carcass. In FIG. 28, an operator uses a knife to start to make a cut to mark the top sirloin. FIG. 29 shows the top sirloin having been marked on the loin region of the carcass.

Figure 30:
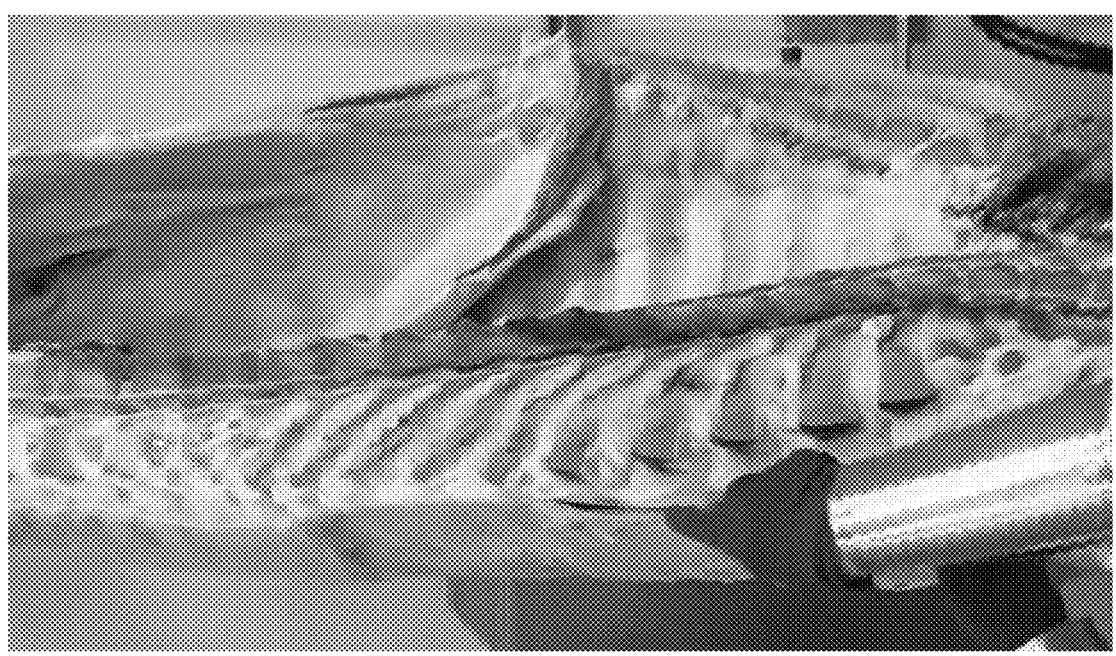
FIG. 30 shows an image of an operator using a knife to cutting along the outside of the back strap to begin an operation of removing the back strap from a hot carcass.
Figure 32:
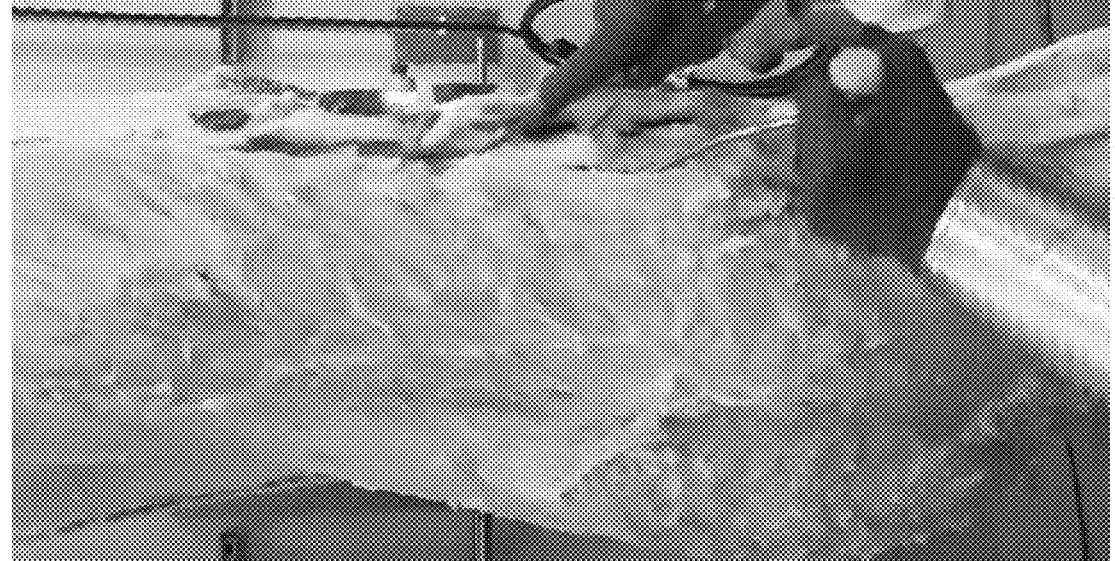
FIG. 32 shows an image of the operator of FIG. 30 grabbing the rear (upward in FIG. 32) of the back strap with a hook and pulls frontward toward the neck (downward in FIG. 32), while cutting along the parts of the back strap that are still attached to the carcass.
Figure 31:
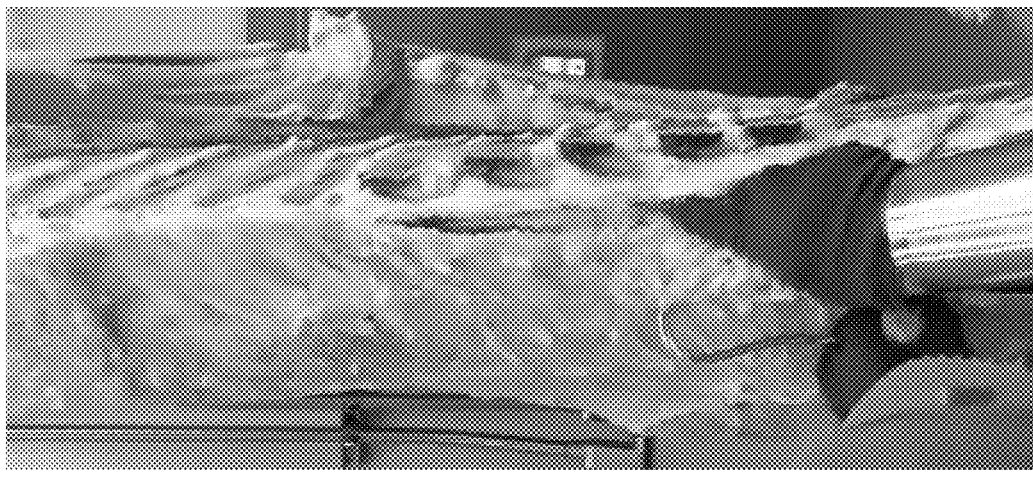
FIG. 31 shows an image of the operator of FIG. 30 cutting along the inside of the back strap.
Figure 33:
FIG. 33 shows an image of the operator of FIG. 30 continuing to pull the rear of the back strap with the hook while cutting along the parts of the back strap that are still attached to the carcass.
Figure 34:
FIG. 34 shows an image of the operator of FIG. 30 making a final cut in the neck region to remove the back strap from the carcass.

In some embodiments, the carcass preparation process can include an operation of removing the back strap (i.e., the neck-to-rib tendon). FIGS. 30-34 show operations in the carcass preparation process on a hot carcass in which operator is using a knife to remove the back strap. In FIG. 30, an operator uses a knife to cut along the outside of the back strap. In FIG. 31, the operator cuts along the inside of the back strap. In FIG. 32, the operator grabs the rear (upward in FIG. 32) of the back strap with a hook and pulls frontward toward the neck (downward in FIG. 32), while cutting along the parts of the back strap that are still attached to the carcass. In FIG. 33, the operator continues to pull the rear of the back strap with the hook while cutting along the parts of the back strap that are still attached to the carcass. In FIG. 34, the operator makes a final cut in the neck region to remove the back strap from the carcass.

Figure 36:
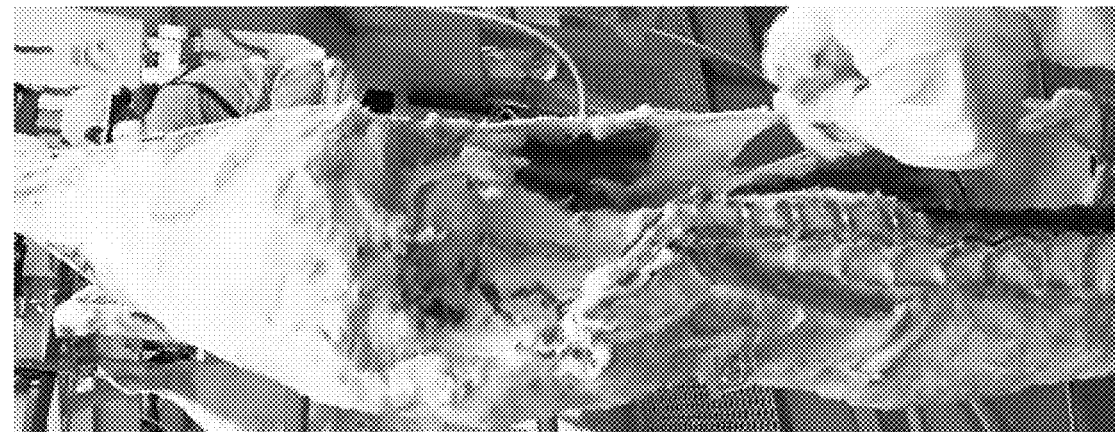
FIG. 36 shows an image of the operator of FIG. 36 continuing to pull downward toward the neck to peel away and remove the flank tunic.
Figure 35:
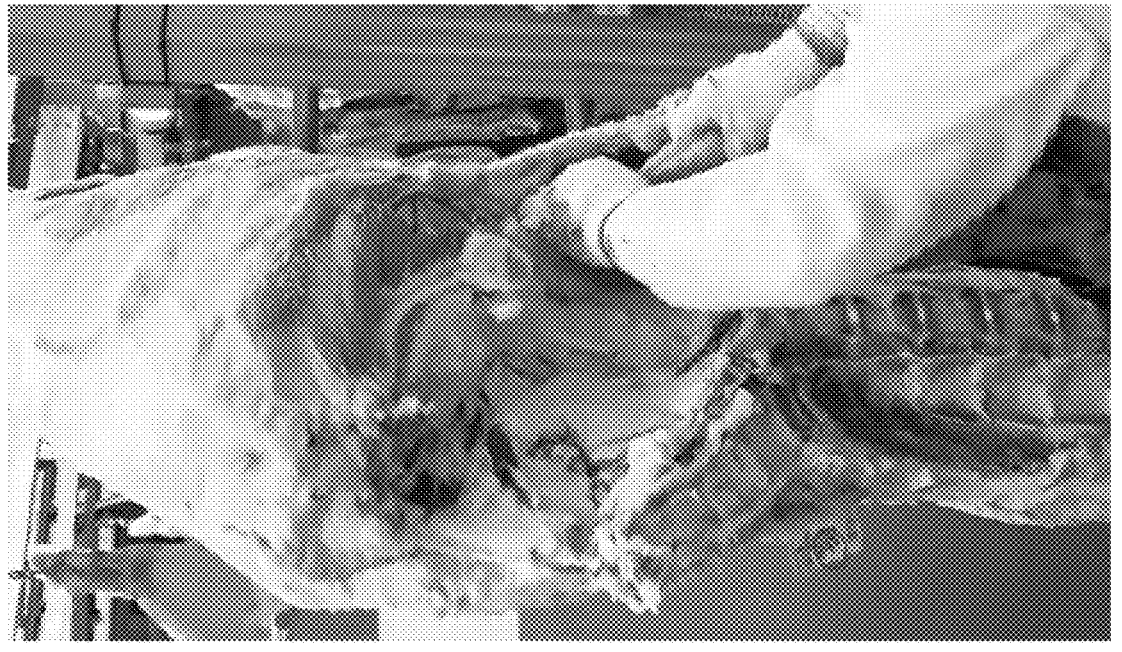
FIG. 35 shows an image of an operator using his hands to start to pull toward the neck (downward in FIG. 35) on the flank steam membrane to begin an operation of removing the flank steam membrane of a hot carcass.

In some embodiments, the carcass preparation process can include an operation of removing the flank steam membrane (also sometimes referred to as the "flank tunic"). FIGS. 35-36 show an operation in the carcass preparation process on a hot carcass in which the operator is using his hands to remove the flank tunic. In FIG. 35, an operator uses his hands to start to pull toward the neck (downward in FIG. 35) on the flank tunic. In FIG. 36, the operator continues to pull downward toward the neck to peel away and remove the flank tunic.

Figure 37:
FIG. 37 shows an image of an operator uses a knife to cut downward (toward the neck) to begin to seam between the sirloin tip and the bottom round flat of a hot carcass.
Figure 38:
FIG. 38 shows an image of the operator of FIG. 37 cutting upward (toward the rear leg) and across the top of the patella bone as the carcass hangs from the rear leg, exposing the patella bone.

In some embodiments, the carcass preparation process can include an operation of pre-seaming of the sirloin tip and the bottom round flat, which can include marking the patella bone. FIGS. 37-38 show operations in the carcass preparation process on a hot carcass in which the operator is using a knife to pre-seam the sirloin tip and the bottom round flat in the round region of the carcass. In FIG. 37, an operator uses a knife to cut downward (toward the neck) to begin to seam between the sirloin tip and the bottom round flat. In FIG. 38, the operator cuts upward (toward the rear leg) and across the top of the patella bone as the carcass hangs from the rear leg, exposing the patella bone.

Figure 39:
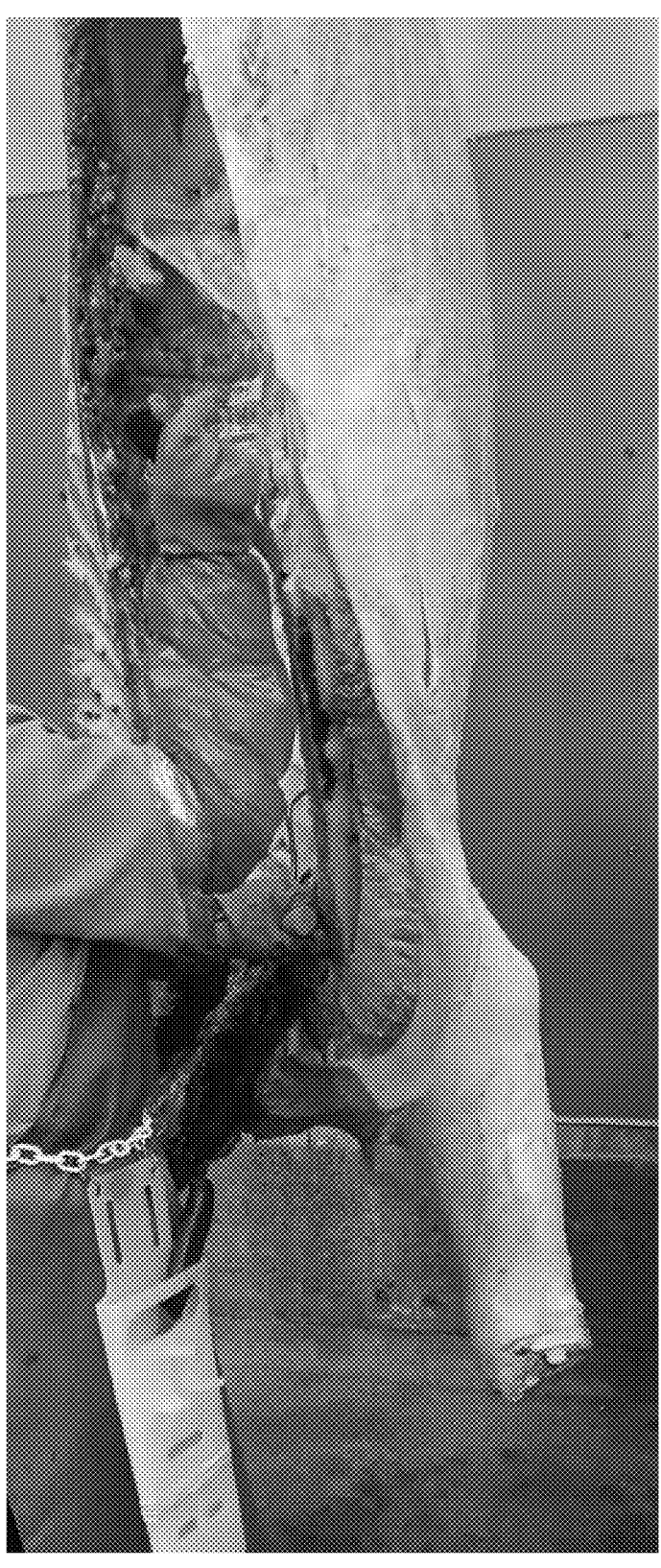
FIG. 39 shows an image of an operator using a knife to mark the outside skirt of the brisket of a hot carcass.

In some embodiments, the carcass preparation process can include an operation of marking the brisket (outside skirt of the brisket) on the rib region of the carcass. FIG. 39 shows an operation in the carcass preparation process on a hot carcass in which the operator is using a knife to mark the outside skirt of the brisket.

Figure 40:
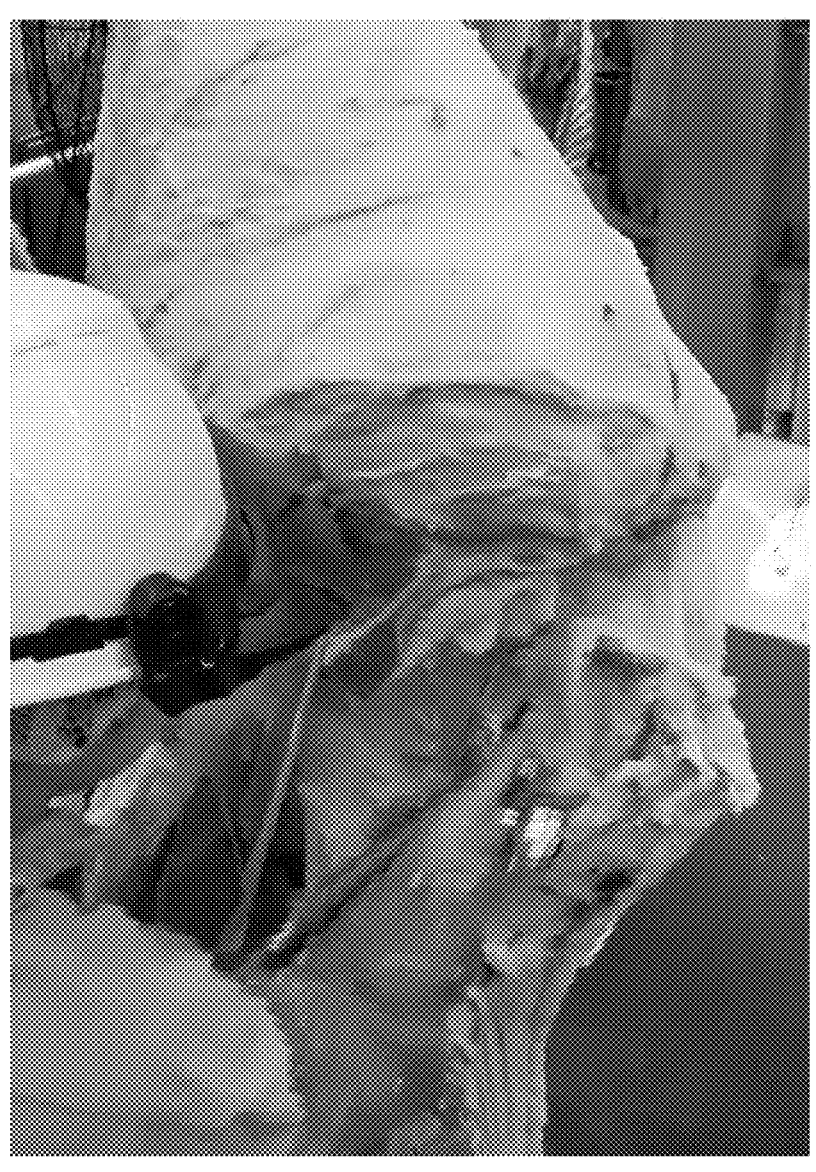
FIG. 40 shows an image of an operator using a power trimming knife to remove internal pelvic fat of a hot carcass.
Figure 41:
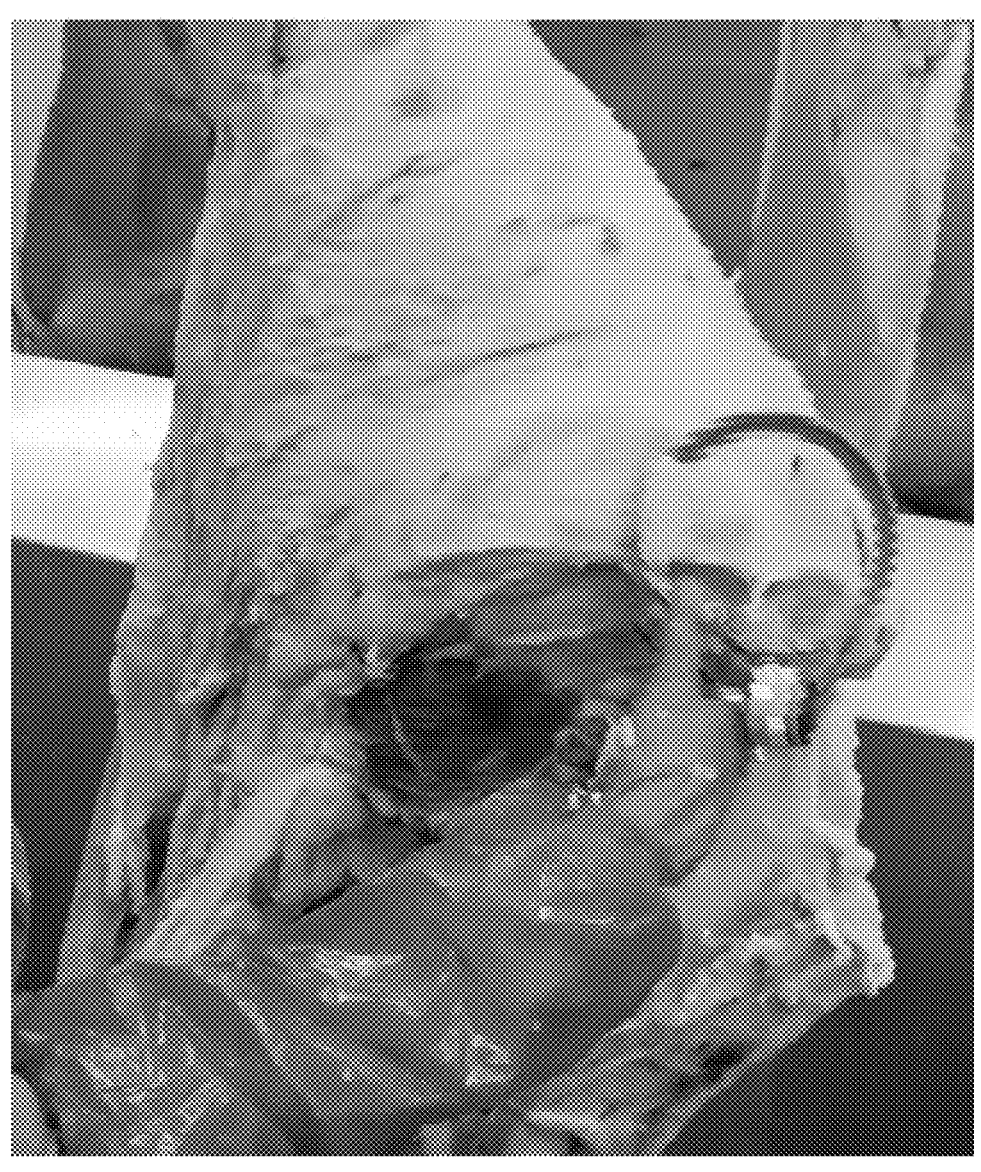
FIG. 41 shows an image of an operator using a power trimming knife to trim external fat in the round region of a hot carcass.
Figure 42:
FIG. 42 shows an image of the operator of FIG. 41 continuing to use a power trimming knife to trim external fat in the round region of the carcass.
Figure 44:
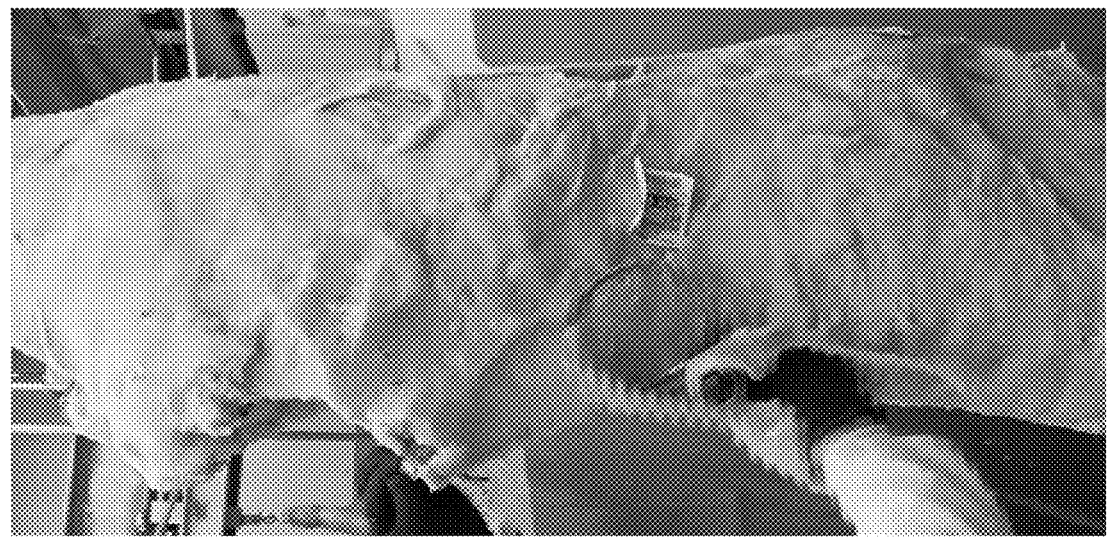
FIG. 44 shows an image of the operator of FIG. 43 continuing to use a power trimming knife to trim external fat in the loin region of the carcass.
Figure 43:
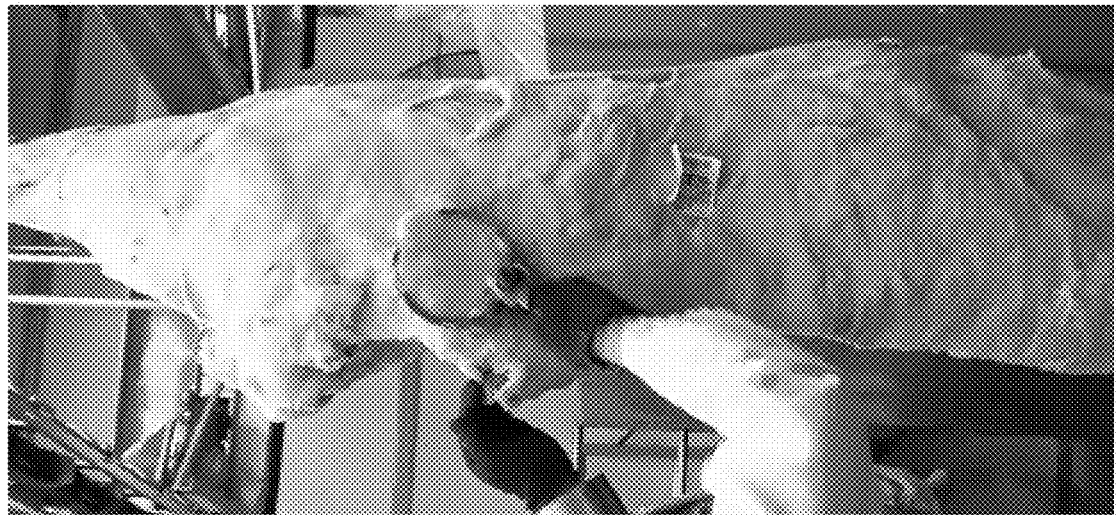
FIG. 43 shows an image of an operator using a power trimming knife to trim external fat in the loin region of a hot carcass.
Figure 45:
FIG. 45 shows an image of the operator of FIG. 43 continuing to use a power trimming knife to trim external fat in the loin region of the carcass.
Figure 46:
FIG. 46 shows an image of an operator using a power trimming knife to remove internal kidney fat in the loin region of a hot carcass.
Figure 47:
FIG. 47 shows an image of the operator of FIG. 46 continuing to use a power trimming knife to remove internal kidney fat in the loin region of the carcass.
Figure 49:
FIG. 49 shows an image of the operator of FIG. 48 continuing to use a power trimming knife to rib cap fat on the outer side of the rib region of the carcass.
Figure 48:
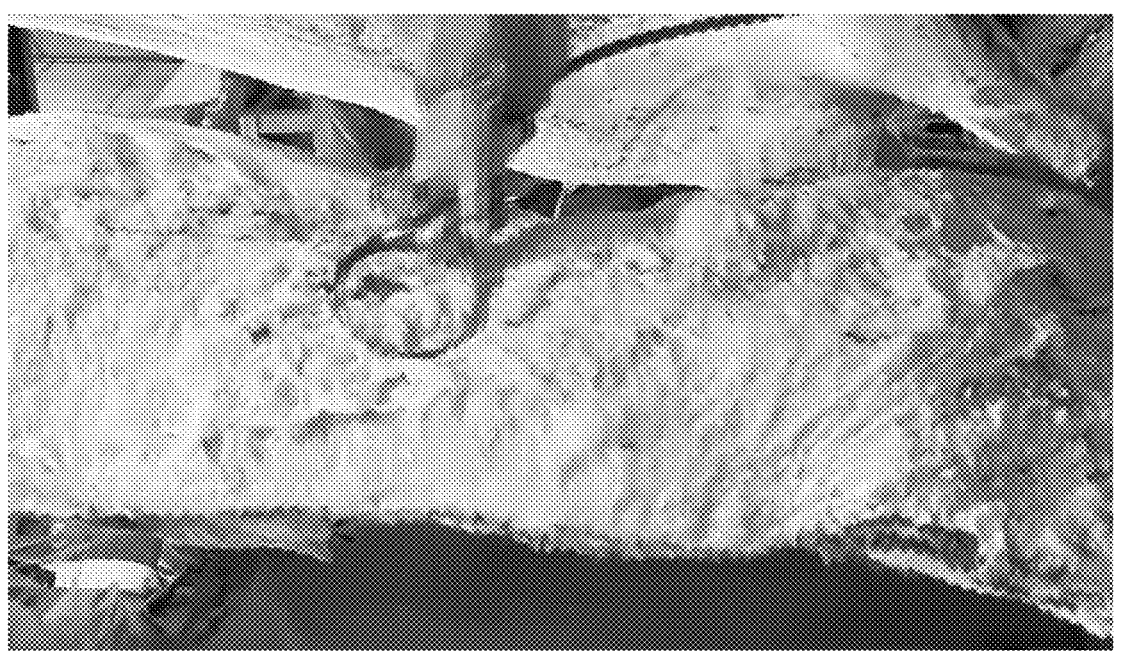
FIG. 48 shows an image of an operator using a power trimming knife to trim external rib cap fat on the outer side of the rib region of a hot carcass.
Figure 51:
FIG. 51 shows an image of an operator using a power trimming knife to trim external rib cap fat on the outer top of the rib region of a hot carcass.
Figure 50:
FIG. 50 shows an image of the operator of FIG. 48 continuing to use a power trimming knife to rib cap fat on the outer side of the rib region of the carcass.
Figure 53:
FIG. 53 shows an image of the operator of FIG. 51 continuing to use a power trimming knife to trim external rib cap fat on the outer top of the rib region of the carcass.
Figure 53:
Figure 52:
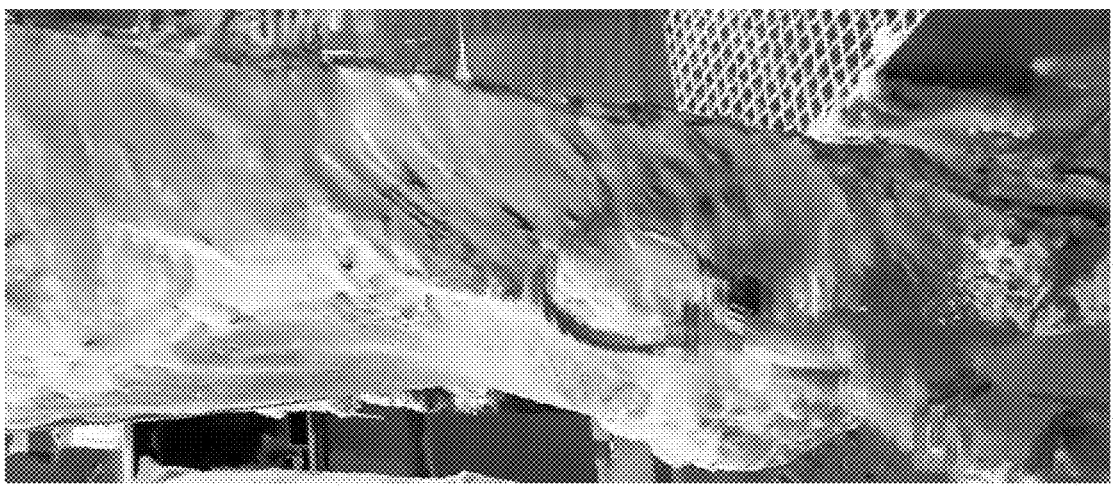
FIG. 52 shows an image of the operator of FIG. 51 continuing to use a power trimming knife to trim external rib cap fat on the outer top of the rib region of the carcass.
Figure 54:
FIG. 54 shows an image of the operator using a knife to remove tri tip fat of a hot carcass.
Figure 55:
FIG. 55 shows an image of the operator of FIG. 54 continuing to use a knife to remove tri tip fat of the carcass.
Figure 56:
FIG. 56 shows an image of the operator of FIG. 54 continuing to use a knife to remove tri tip fat of the carcass.
Figure 58:
FIG. 58 shows an image of the operator of FIG. 57 continuing to use a power trimming knife to trim fat in the shoulder area of the carcass.
Figure 57:
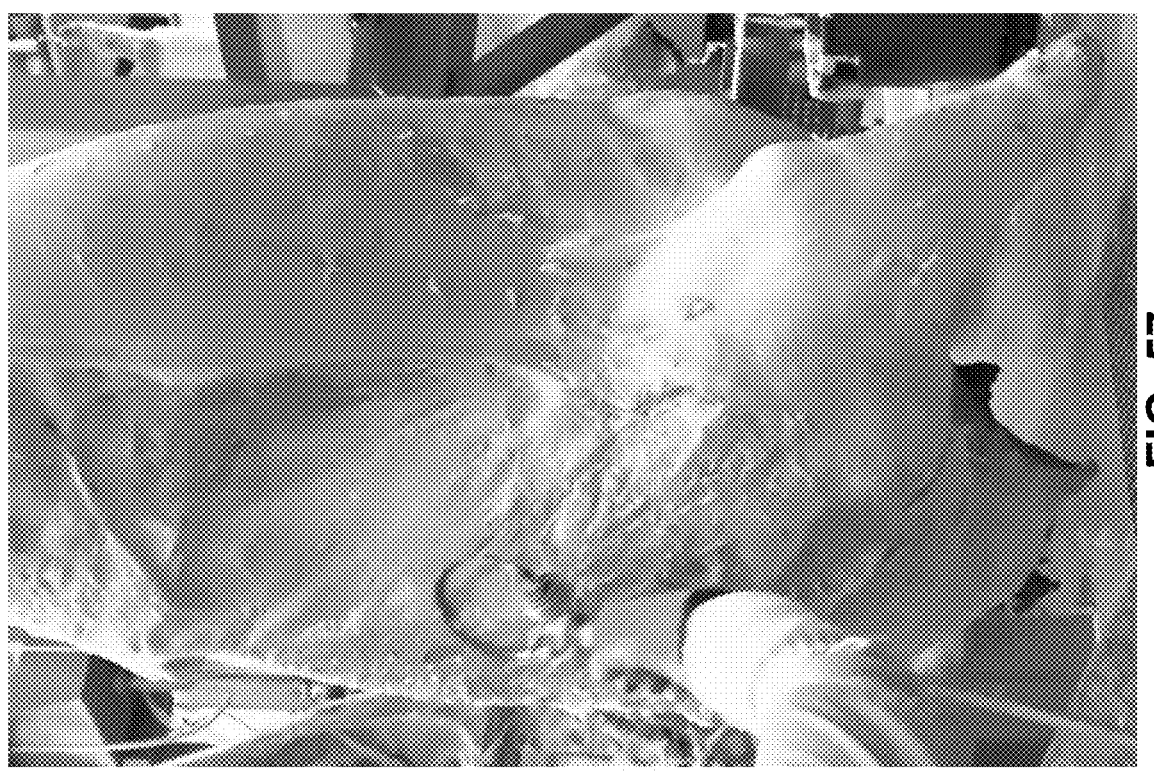
FIG. 57 shows an image of an operator using a power trimming knife to trim fat in the shoulder area of a hot carcass.
Figure 60:
FIG. 60 shows an image of the operator of FIG. 57 continuing to use a power trimming knife to trim fat in the shoulder area of the carcass.
Figure 59:
FIG. 59 shows an image of the operator of FIG. 57 continuing to use a power trimming knife to trim fat in the shoulder area of the carcass.

In some embodiments, the carcass preparation process can include various operations of removing internal and/or external fat from the carcass. For example, FIG. 40 shows an operation in the carcass preparation process on a hot carcass in which the operator is using a power trimming knife with concentric annular rotary blades (e.g., a Whizard® trimming knife) to remove internal pelvic fat. FIGS. 41-42 show an operation in the carcass preparation process on a hot carcass in which the operator is using a power trimming knife to trim external fat in the round region of the carcass, such as the fat from the top round, round eye, and the bottom round. FIGS. 43-45 show an operation in the carcass preparation process on a hot carcass in which the operator is using a power trimming knife to trim external fat in the loin region of the carcass, such as removing external fat from the top sirloin of the carcass. FIGS. 46-47 show an operation in the carcass preparation process on a hot carcass in which the operator is using a power trimming knife to remove internal kidney fat in the loin region of the carcass. FIGS. 48-50 show an operation in the carcass preparation process on a hot carcass in which the operator is using a power trimming knife to trim external rib cap fat on the outer side of the rib region of the carcass. FIGS. 51-53 show an operation in the carcass preparation process on a hot carcass in which the operator is using a power trimming knife to trim external rib cap fat on the outer top of the rib region of the carcass. FIGS. 54-56 show an operation in the carcass preparation process on a hot carcass in which the operator is using a knife to remove tri tip fat. FIGS. 57-60 show an operation in the carcass preparation process on a hot carcass in which the operator is using a power trimming knife to trim fat in the shoulder area of the carcass. In various embodiments, the carcass preparation process can include additional or other operations of removing internal and/or external fat, such as removing fat from the head of the loin, removing fat from the lower section of the loin, and/or other suitable areas. A secondary scale is placed after the hot scale and at the end of the carcass preparation activities (that remove fat and bones) to enable and maintain the integrity of the internal management tools.

Because removal and/or trimming of fat on the hot carcass can be more precise than fat removal on the fab side, the cuts of meat packaged for customers on the fab side can include less fat, which can reduce the amount of fat that ultimately gets wasted. When fat is included on the cuts of meat (e.g., subprimal cuts) packaged for customers, in general, that fat will ultimately get cut off by the customer and discarded as waste. By contrast, when fat is removed at the beef processing plant, it is collected and processed in rendering for uses in other applications. Moreover, when the amount of fat on a cut that is sold to a customer (e.g., a commercial customer) exceeds a certain amount or thickness, such customer may be disappointed with the product because of the excess fat included on the cut.

Figure 61:
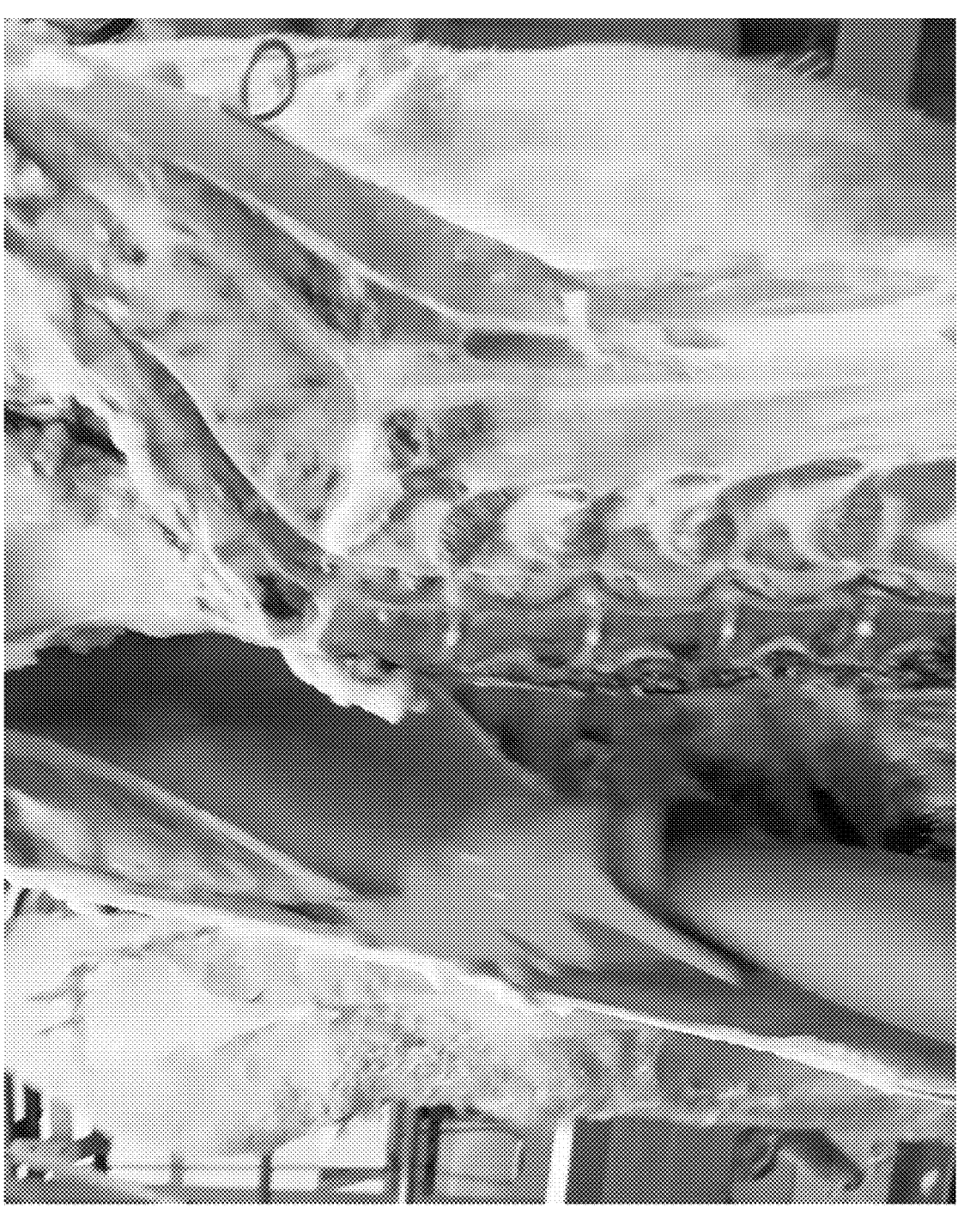
FIG. 61 shows an image of an operator using a knife to mark the flank steak of a hot carcass.
Figure 62:
FIG. 62 shows an image of the operator of FIG. 61 continuing cutting to mark the flank steak.
Figure 63:
FIG. 63 shows an image of the operator of FIG. 61 using a knife to cut along the top of the flank steak membrane to being to remove the flank steak membrane.
Figure 64:
FIG. 64 shows an image of the operator of FIG. 61 pulling downward (toward the neck) using a hook on the flank steam membrane.
Figure 65:
FIG. 65 shows an image after the operator of FIG. 61 has continued to pull downward on the flank steak membrane and peeled away the flank steam membrane.

In some embodiments, the carcass preparation process can include an operation of marking the flank steak. FIGS. 61-65 show operations in the carcass preparation process on a hot carcass in which the operator is using a knife to mark the flank steak to separate the flank steak from tissue (FIGS. 61-62), and in which the operator uses a knife and a hook to remove the flank steam membrane (flank tunic) (FIGS. 63-65, which are similar to FIGS. 35-36). In FIG. 61, the operator uses a knife to mark the flank steak. In FIG. 62, the operator continues cutting to mark the flank steak. In some embodiments, marking the flank steak, such as shown in FIGS. 61-62, can be performed before removing the flank steam membrane, such as shown in FIGS. 63-65. In FIG. 63, the operator uses a knife to cut along the top of the flank steak membrane. In FIG. 64, operator pulls downward (toward the neck) using a hook on the flank steam membrane. FIG. 65 shows after the operator has continued to pull downward on the flank steak membrane and peeled away the flank steam membrane.

Figure 66:
FIG. 66 shows an image of an operator using a knife to begin to mark the rib cap muscles (lifter meat) of a hot carcass.

In some embodiments, the carcass preparation process can include an operation of marking the rib cap muscles ("lifter meat") of the beef carcass. FIGS. 66-67 show an operation in the carcass preparation process on a hot carcass in which the operator is using a knife to mark the lifter meat. In FIG. 66, the operator uses a knife to begin to mark the lifter meat. In FIG. 67, the operator continues cutting to mark the lifter meat.

In some embodiments, additional operations conventionally performed on the fab side can be performed during carcass preparation processing. In various embodiments, some of the operations that have been done conventionally in the hide-off processing at some beef processing plants can be performed as part of the carcass preparation processing, such as in a separate carcass preparation room. For example, the operations of pulling the inside skirt, shoulder separation (i.e., "opening the web"), feather bone popping, marking the brisket (such as described above), and/or seaming the sirloin tip (such as described above) can be included with the carcass preparation processing in addition to the new operations as described above, and in some embodiments can be performed in the separate carcass preparation room.

In many embodiments, by performing operations in the carcass preparation process while the carcass is still hot or warm, the overall processing of the carcass through the end of fab-floor processing can be faster, requiring less physical labor, less physically demanding, and more ergonomic. For example, many of the difficult operations performed by highly skilled operators on cold meat on the fab side can be eliminated, and/or significantly lessened, from the fab-side processing and replaced by easier operations on the hot carcass that can be performed by lower-skilled operators, and less operators, in the carcass preparation process. In some embodiments, 5 or more operations, 10 or more operations, 15 or more operations, 20 or more operations, 25 or more operations, or in some cases even 30 or more operations can be eliminated from the fabrication side. The operations added to the carcass preparation process to replace these fab-side operations can be performed faster, with less labor, and which can allow more heads of cattle to be processed through the facility in the same amount of time. The carcass preparation process can thus advantageously serve as an accelerator to process more cattle than previously possible due to the prior processing limitations on the fab side.

Due to the ergonomic challenges and significant labor involved in manipulating, lifting, and cutting tougher, cold meat on the fab side, there have been calls to reduce the chain speed on the fab side. By removing a number of the very difficult operations from the fab side, and replacing them with easier operation in the new carcass preparation process, many of the ergonomic issues can beneficially be solved on the fab side without decreasing chain speed and, indeed, can facilitate increasing chain speed and throughput. These ergonomic improvements can result in improved work conditions and job satisfaction for a significant number of employees by making their jobs easier to learn and perform, resulting in less injuries, increased job satisfaction, employee retention, and increased profitability. These changes also can result in fewer hours worked by operators to process the same amount of cattle, fewer injuries, better work schedules, and/or increased longevity and retention.

In many embodiments, the carcass preparation process can result in less carcass load being moved into the coolers, as more of the fat and/or the bones can be removed during the carcass preparation process. Because there is less load being moved into the coolers per carcass, the refrigeration usage per carcass can be less, the carcasses can be chilled faster, and/or less energy is required to cool the carcasses. Additionally, the amount of chilled water used in the chilling process can be reduced due to the reduced load. Further, the reduced load can result in more efficient usage of the carcass coolers in terms of physical space and/or time spent in the coolers.

Many of the operations of the carcass preparation process can open up and expose more surfaces of the carcass than previously exposed, which can allow heat to be released quicker from the exterior and interior of the carcass and can result in the carcass being chilled faster and/or more efficiently. In some cases, more efficient chilling can result in increased meat tenderness. This improvement also results in the use of less energy to cool the carcasses.

Although systems and methods for carcass preparation in beef processing have been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that any element of FIGS. 1-67 may be modified, and that the foregoing discussion of certain of these embodiments does not necessarily represent a complete description of all possible embodiments.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method comprising:
    after at least hide removal and pathogen cleaning of a beef carcass, performing two or more carcass preparation operations on the beef carcass in a carcass preparation room that is separate from other hide-off processing that includes one or more of splitting the beef carcass into halves, hanging the beef carcass, or electrical stimulation of the beef carcass, wherein the two or more carcass preparation operations are performed on the beef carcass in the carcass preparation room to produce a modified beef carcass while a temperature of the beef carcass is above 80° F.;
    cooling the modified beef carcass after performing the two or more carcass preparation operations on the beef carcass to cause the modified beef carcass to be chilled to below 44° F. during cooling of the modified beef carcass after the two or more carcass preparation operations are performed on the beef carcass; and
    after cooling the modified beef carcass to below 44° F., performing fabrication floor processing on the modified beef carcass to separate the modified beef carcass into primal cuts.

2. The method of claim 1, wherein the two or more carcass preparation operations are performed on the beef carcass while the beef carcass is hanging from an overheard conveyor.

3. The method of claim 1, wherein the carcass preparation room is a cooled room.

4. The method of claim 1, wherein a quantity of fat removed from the beef carcass before the beef carcass is chilled to below 44° F. during cooling of the modified beef carcass is at or above approximately 65 pounds.

5. The method of claim 1, wherein the two or more carcass preparation operations performed in the carcass preparation room comprise at least one of:

boning of a neck bone of the beef carcass;

marking at least one of a brisket bone oyster, a round oyster, a top sirloin, a flank steak, or rib cap muscles of the beef carcass;

at least one of pre-seaming between a top round and a round eye of the beef carcass, pre-seaming between the round eye and a bottom round flat of the beef carcass, or pre-seaming between a sirloin tip and the bottom round flat of the beef carcass;

peeling a banana shank of the beef carcass;

dropping a rear portion of a tri-tip of the beef carcass;

chining of a chuck bone of the beef carcass;

removing a back strap of the beef carcass;

removing a flank steak membrane of the beef carcass; or trimming or removing at least one of internal pelvic fat, bottom round fat, loin area fat, tri-tip fat, or shoulder area fat, of the beef carcass.

6. The method of claim 1, wherein the two or more carcass preparation operations performed in the carcass preparation room comprise at least one of:

trimming or removing at least one of kidney fat, rib cap fat, or top round fat of the beef carcass;

pulling an inside skirt of the beef carcass;

popping a feather pone of the beef carcass;

separating a shoulder and a chuck blade of the beef carcass;

pre-seaming between a sirloin tip and a top round of the beef carcass; or marking of a brisket bone or an outside skirt of a brisket of the beef carcass.

7. The method of claim 1, wherein performing the two or more carcass preparation operations on the beef carcass in the carcass preparation room that is separate from the other hide-off processing comprises performing ten or more carcass preparation operations on the beef carcass in the carcass preparation room that is separate from the other hide-off processing.

8. A method comprising:

after at least hide removal and pathogen cleaning of a beef carcass, performing one or more carcass preparation operations on the beef carcass, wherein the one or more carcass preparation operations are performed on the beef carcass to produce a modified beef carcass while a temperature of the beef carcass is above 80° F.;

cooling the modified beef carcass after performing the one or more carcass preparation operations on the beef carcass to cause the modified beef carcass to be chilled to below 44° F. during cooling of the modified beef carcass after the one or more carcass preparation operations are performed on the beef carcass; and after cooling the modified beef carcass to below 44° F., performing fabrication floor processing on the modified beef carcass to separate the modified beef carcass into primal cuts, wherein the one or more carcass preparation operations comprise at least one of:

boning of a neck bone of the beef carcass;

marking at least one of a brisket bone oyster, a round oyster, a top sirloin, a flank steak, or rib cap muscles of the beef carcass;

at least one of pre-seaming between a top round and a round eye of the beef carcass of the beef carcass, pre-seaming between the round eye and a bottom round flat of the beef carcass of the beef carcass, or pre-seaming between a sirloin tip and the bottom round flat of the beef carcass;

peeling a banana shank of the beef carcass;

dropping a rear portion of a tri-tip of the beef carcass;

chining of a chuck bone of the beef carcass;

removing a back strap of the beef carcass;

removing a flank steak membrane of the beef carcass; or trimming or removing at least one of internal pelvic fat, bottom round fat, loin area fat, tri-tip fat, or shoulder area fat of the beef carcass.

9. The method of claim 8, wherein the one or more carcass preparation operations are performed on the beef carcass while the beef carcass is hanging from an overheard conveyor.

10. The method of claim 8, wherein the one or more carcass preparation operations are performed in a carcass preparation room that is separate from other hide-off processing.

11. The method of claim 10, wherein the carcass preparation room is a cooled room.

12. The method of claim 8, wherein a quantity of fat removed from the beef carcass before the beef carcass is chilled to below 44° F. during cooling of the beef carcass is at or above approximately 65 pounds.

13. The method of claim 8, wherein the one or more carcass preparation operations comprise boning of the neck bone of the beef carcass.

14. The method of claim 8, wherein the one or more carcass preparation operations comprise marking at least one of the brisket bone oyster, the round oyster, the top sirloin, the flank steak, or the rib cap muscles of the beef carcass.

15. The method of claim 8, wherein the one or more carcass preparation operations comprise at least one of pre-seaming between the top round and the round eye of the beef carcass, pre-seaming between the round eye and the bottom round flat of the beef carcass, or pre-seaming between the sirloin tip and the bottom round flat of the beef carcass.

16. The method of claim 8, wherein the one or more carcass preparation operations comprise peeling the banana shank of the beef carcass.

17. The method of claim 8, wherein the one or more carcass preparation operations comprise dropping the rear portion of the tri-tip of the beef carcass.

18. The method of claim 8, wherein the one or more carcass preparation operations comprise chining of the chuck bone of the beef carcass.

19. The method of claim 8, wherein the one or more carcass preparation operations comprise removing the back strap of the beef carcass.

20. The method of claim 8, wherein the one or more carcass preparation operations comprise removing the flank steak membrane of the beef carcass.

21. The method of claim 8, wherein the one or more carcass preparation operations comprise trimming or removing at least one of the internal pelvic fat, the bottom round fat, the loin area fat, the tri-tip fat, or the shoulder area fat of the beef carcass.

* * * * *